United States Patent
Maeda

(10) Patent No.: US 6,658,378 B1
(45) Date of Patent: Dec. 2, 2003

(54) DECODING METHOD AND APPARATUS AND PROGRAM FURNISHING MEDIUM

(75) Inventor: Yuuji Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 478 days.

(21) Appl. No.: 09/595,215

(22) Filed: Jun. 16, 2000

(30) Foreign Application Priority Data

Jun. 17, 1999 (JP) .......................................... P11-170574

(51) Int. Cl.⁷ .............................................. G10L 21/02
(52) U.S. Cl. ..................... 704/200.1; 704/226; 704/229; 704/214
(58) Field of Search ................................ 704/205–230, 704/200.1

(56) References Cited

U.S. PATENT DOCUMENTS

| | | | |
|---|---|---|---|
| 5,255,343 A | * 10/1993 | Su | 704/242 |
| 5,473,727 A | * 12/1995 | Nishiguchi | 704/222 |
| 5,734,789 A | * 3/1998 | Swaminathan et al. | 704/206 |
| 5,828,996 A | * 10/1998 | Iijima et al. | 704/220 |
| 5,918,204 A | * 6/1999 | Tsurumaru | 704/214 |
| 6,230,124 B1 | * 5/2001 | Maeda | 704/227 |

FOREIGN PATENT DOCUMENTS

EP           0 603 854 A2  *  6/1994  .............. G10L/5/06

* cited by examiner

*Primary Examiner*—Richemond Dorvil
*Assistant Examiner*—Abul K. Azad
(74) *Attorney, Agent, or Firm*—Jay H. Maioli

(57) ABSTRACT

In a low bitrate speech encoding system, encoded bits are strongly protected against errors produced on a transmission path. A decoding side checks the transmission errors using an error check code appended to a convolution decoded output and adjusts the decoding output depending on the results of check of transmission errors. At this time, it is necessary to maintain continuity of speech signals after speech decoding. To this end, a convolution decoder 16 convolution decodes the convolution coded output from the encoding device to provide a convolution decoded output of a crucial bit set with the appended error check code and a bit set excluding the crucial bit set. A CRC code comparator-frame masking unit 15 compares the CRC check code appended to the convolution decoded output from the convolution decoder 16 to the CRC check code computed from the bit group excluding the crucial bit set to adjust the convolution decoded output.

13 Claims, 26 Drawing Sheets

| PARAMETERS | MEANING | NUMBER OF BITS |
|---|---|---|
| LSP0 | LSP index 0 | (5 bit) |
| LSP2 | LSP index 2 | (7 bit) |
| LSP3 | LSP index 3 | (5 bit) |
| LSP4 | LSP index 4 | (1 bit) |
| VUV | voiced/unvoiced flag | (2 bit) |
| PCH | pitch parameter | (7 bit) |
| idS0 | spectrum index 0 | (4 bit) |
| idS1 | spectrum index 1 | (4 bit) |
| idG | spectrum gain index | (5 bit) |
| idSL00 | stochastic codebook index 0 | (6 bit) |
| idSL01 | stochastic codebook index 1 | (6 bit) |
| idGL00 | gain codebook index 0 | (4 bit) |
| idGL01 | gain codebook index 1 | (4 bit) |

FIG.4

| PARAMETERS | MEANING | NUMBER OF BITS |
|---|---|---|
| LSP5 | LSP index 5 | (8 bit) |
| idS0_4k | 4k spectrum index 0 | (7 bit) |
| idS1_4k | 4k spectrum index 1 | (10 bit) |
| idS2_4k | 4k spectrum index 2 | (9 bit) |
| idS3_4k | 4k spectrum index 3 | (6 bit) |
| idSL10 | 4k stochastic codebook index 0 | (5 bit) |
| idSL11 | 4k stochastic codebook index 1 | (5 bit) |
| idSL12 | 4k stochastic codebook index 2 | (5 bit) |
| idSL13 | 4k stochastic codebook index 3 | (5 bit) |
| idGL10 | 4k gain codebook index 0 | (3 bit) |
| idGL11 | 4k gain codebook index 1 | (3 bit) |
| idGL12 | 4k gain codebook index 2 | (3 bit) |
| idGL13 | 4k gain codebook index 3 | (3 bit) |

FIG.5

| parameters | class I bits | class II bits | class III bits | voiced sound class IV bits | class V bits | class VI bits | total |
|---|---|---|---|---|---|---|---|
| LSP0p/c | 5/5 | - | - | - | - | - | 10 |
| LSP2p/c | 2/2 | - | - | - | - | 5/5 | 14 |
| LSP3p/c | 1/1 | - | - | - | - | 4/4 | 10 |
| LSP4p/c | 1/1 | - | - | - | - | - | 2 |
| VUVp/c | 2/2 | - | - | - | - | - | 4 |
| PCHp/c | 6/6 | - | - | - | - | 1/1 | 14 |
| idGp/c | 5/5 | - | - | - | - | - | 10 |
| idS0p | - | 4 | - | - | - | - | 4 |
| idS0c | - | - | - | 4 | - | - | 4 |
| idS1p | - | - | 4 | - | - | - | 4 |
| idS1c | - | - | - | - | 4 | - | 4 |
| total | 44 | 4 | 4 | 4 | 4 | 20 | 80 |

FIG.6

| parameters | class I bits | class II bits | class III bits | unvoiced sound class IV bits | class V bits | class VI bits | total |
|---|---|---|---|---|---|---|---|
| LSP0p/c | 5/5 | - | - | - | - | - | 10 |
| LSP2p/c | 4/4 | - | - | - | - | 3/3 | 14 |
| LSP3p/c | 2/2 | - | - | - | - | 3/3 | 10 |
| LSP4p/c | 1/1 | - | - | - | - | - | 2 |
| VUVp/c | 2/2 | - | - | - | - | - | 4 |
| idGL00p/c | 4/4 | - | - | - | - | - | 8 |
| idGL01p/c | 4/4 | - | - | - | - | - | 8 |
| idSL00p/c | - | - | - | - | - | 6/6 | 12 |
| idSL01p/c | - | - | - | - | - | 6/6 | 12 |
| total | 44 | 0 | 0 | 0 | 0 | 36 | 80 |

FIG.7

| parameters | voiced sound | | | | | | | total |
|---|---|---|---|---|---|---|---|---|
| | class I bits | class II bits | class III bits | class IV bits | class V bits | class VI bits | class VII bits | |
| LSP0p/c | 5/5 | - | - | - | - | - | - | 10 |
| LSP2p/c | 4/4 | - | - | - | - | - | 3/3 | 14 |
| LSP3p/c | 1/1 | - | - | - | - | - | 4/4 | 10 |
| LSP4p/c | 1/1 | - | - | - | - | - | - | 2 |
| LSP5p/c | 1/1 | - | - | - | - | - | 7/7 | 16 |
| VUVp/c | 2/2 | - | - | - | - | - | - | 4 |
| PCHp/c | 6/6 | - | - | - | - | - | 1/1 | 14 |
| idGp/c | 5/5 | - | - | - | - | - | - | 10 |
| idS0p | - | - | 4 | - | - | - | - | 4 |
| idS0c | - | - | - | - | 4 | - | - | 4 |
| idS1p | - | - | - | 4 | - | - | - | 4 |
| idS1c | - | - | - | - | - | 4 | - | 4 |
| idS0_4kp/c | 5/5 | - | - | - | - | - | 2/2 | 14 |
| idS1_4kp/c | 1/1 | 9/9 | - | - | - | - | - | 20 |
| idS2_4kp/c | 1/1 | 8/8 | - | - | - | - | - | 18 |
| idS3_4kp/c | 1/1 | 5/5 | - | - | - | - | - | 12 |
| total | 66 | 44 | 4 | 4 | 4 | 4 | 34 | 160 |

FIG.8

| parameters | class I bits | class II bits | class III bits | class IV bits | unvoiced sound class V bits | class VI bits | class VII bits | total |
|---|---|---|---|---|---|---|---|---|
| LSP0p/c | 5/5 | - | - | - | - | - | - | 10 |
| LSP2p/c | 4/4 | - | - | - | - | - | 3/3 | 14 |
| LSP3p/c | 1/1 | - | - | - | - | - | 4/4 | 10 |
| LSP4p/c | 1/1 | - | - | - | - | - | - | 2 |
| LSP5p/c | 1/1 | - | - | - | - | - | 7/7 | 16 |
| VUVp/c | 2/2 | - | - | - | - | - | - | 4 |
| idGL00p/c | 4/4 | - | - | - | - | - | - | 8 |
| idGL01p/c | 4/4 | - | - | - | - | - | - | 8 |
| idSL00p/c | - | - | - | - | - | - | 6/6 | 12 |
| idSL01p/c | - | - | - | - | - | - | 6/6 | 12 |
| idGL10p/c | 3/3 | - | - | - | - | - | - | 6 |
| idGL11p/c | 3/3 | - | - | - | - | - | - | 6 |
| idGL12p/c | 3/3 | - | - | - | - | - | - | 6 |
| idGL13p/c | 2/2 | - | - | - | - | - | 1/1 | 6 |
| idSL10p/c | - | - | - | - | - | - | 5/5 | 10 |
| idSL11p/c | - | - | - | - | - | - | 5/5 | 10 |
| idSL12p/c | - | - | - | - | - | - | 5/5 | 10 |
| idSL13p/c | - | - | - | - | - | - | 5/5 | 10 |
| total | 66 | 0 | 0 | 0 | 0 | 0 | 94 | 160 |

FIG.9

| Voiced sound ||||||||
|---|---|---|---|---|---|---|---|
| No. | Item | Bit | No. | Item | Bit | No. | Item | Bit |
| Class I Bit ||| 28 | idGc | 1 | 54 | idS0c | 1 |
| 0 | VUVp | 1 | 29 | idGc | 0 | 55 | idS0c | 0 |
| 1 | VUVp | 0 | 30 | LSP0c | 4 | Class V Bit |||
| 2 | LSP4p | 0 | 31 | LSP0c | 3 | 56 | idS1c | 3 |
| 3 | idGp | 4 | 32 | LSP0c | 2 | 57 | idS1c | 2 |
| 4 | idGp | 3 | 33 | LSP0c | 1 | 58 | idS1c | 1 |
| 5 | idGp | 2 | 34 | LSP0c | 0 | 59 | idS1c | 0 |
| 6 | idGp | 1 | 35 | PCHc | 6 | Class VI Bit |||
| 7 | idGp | 0 | 36 | PCHc | 5 | 60 | LSP2p | 4 |
| 8 | LSP0p | 4 | 37 | PCHc | 4 | 61 | LSP2p | 3 |
| 9 | LSP0p | 3 | 38 | PCHc | 3 | 62 | LSP2p | 2 |
| 10 | LSP0p | 2 | 39 | PCHc | 2 | 63 | LSP2p | 1 |
| 11 | LSP0p | 1 | 40 | PCHc | 1 | 64 | LSP2p | 0 |
| 12 | LSP0p | 0 | 41 | LSP2c | 6 | 65 | LSP3p | 3 |
| 13 | PCHp | 6 | 42 | LSP3c | 4 | 66 | LSP3p | 2 |
| 14 | PCHp | 5 | 43 | LSP2c | 5 | 67 | LSP3p | 1 |
| 15 | PCHp | 4 | Class II Bit ||| 68 | LSP3p | 0 |
| 16 | PCHp | 3 | 44 | idS0p | 3 | 69 | PCHp | 0 |
| 17 | PCHp | 2 | 45 | idS0p | 2 | 70 | LSP2c | 4 |
| 18 | PCHp | 1 | 46 | idS0p | 1 | 71 | LSP2c | 3 |
| 19 | LSP2p | 6 | 47 | idS0p | 0 | 72 | LSP2c | 2 |
| 20 | LSP3p | 4 | Class III Bit ||| 73 | LSP2c | 1 |
| 21 | LSP2p | 5 | 48 | idS1p | 3 | 74 | LSP2c | 0 |
| 22 | VUVc | 1 | 49 | idS1p | 2 | 75 | LSP3c | 3 |
| 23 | VUVc | 0 | 50 | idS1p | 1 | 76 | LSP3c | 2 |
| 24 | LSP4c | 0 | 51 | idS1p | 0 | 77 | LSP3c | 1 |
| 25 | idGc | 4 | Class IV Bit ||| 78 | LSP3c | 0 |
| 26 | idGc | 3 | 52 | idS0c | 3 | 79 | PCHc | 0 |
| 27 | idGc | 2 | 53 | idS0c | 2 | | | |

FIG.10

| Unvoiced sound ||||||||| 
|---|---|---|---|---|---|---|---|---|
| No. | Item | Bit | No. | Item | Bit | No. | Item | Bit |
| Class I Bit ||| 28 | idGL00c | 0 | 54 | LSP2c | 0 |
| 0 | VUVp | 1 | 29 | idGL01c | 3 | 55 | LSP3c | 2 |
| 1 | VUVp | 0 | 30 | idGL01c | 2 | Class V Bit |||
| 2 | LSP4p | 0 | 31 | idGL01c | 1 | 56 | LSP3c | 1 |
| 3 | idGL00p | 3 | 32 | idGL01c | 0 | 57 | LSP3c | 0 |
| 4 | idGL00p | 2 | 33 | LSP0c | 4 | 58 | idSL00c | 5 |
| 5 | idGL00p | 1 | 34 | LSP0c | 3 | 59 | idSL00c | 4 |
| 6 | idGL00p | 0 | 35 | LSP0c | 2 | Class VI Bit |||
| 7 | idGL01p | 3 | 36 | LSP0c | 1 | 60 | idSL00p | 3 |
| 8 | idGL01p | 2 | 37 | LSP0c | 0 | 61 | idSL00p | 2 |
| 9 | idGL01p | 1 | 38 | LSP2c | 6 | 62 | idSL00p | 1 |
| 10 | idGL01p | 0 | 39 | LSP2c | 5 | 63 | idSL00p | 0 |
| 11 | LSP0p | 4 | 40 | LSP2c | 4 | 64 | idSL01p | 5 |
| 12 | LSP0p | 3 | 41 | LSP2c | 3 | 65 | idSL01p | 4 |
| 13 | LSP0p | 2 | 42 | LSP3c | 4 | 66 | idSL01p | 3 |
| 14 | LSP0p | 1 | 43 | LSP3c | 3 | 67 | idSL01p | 2 |
| 15 | LSP0p | 0 | Class II Bit ||| 68 | idSL01p | 1 |
| 16 | LSP2p | 6 | 44 | LSP2p | 2 | 69 | idSL01p | 0 |
| 17 | LSP2p | 5 | 45 | LSP2p | 1 | 70 | idSL00c | 3 |
| 18 | LSP2p | 4 | 46 | LSP2p | 0 | 71 | idSL00c | 2 |
| 19 | LSP2p | 3 | 47 | LSP3p | 2 | 72 | idSL00c | 1 |
| 20 | LSP3p | 4 | Class III Bit ||| 73 | idSL00c | 0 |
| 21 | LSP3p | 3 | 48 | LSP3p | 1 | 74 | idSL01c | 5 |
| 22 | VUVc | 1 | 49 | LSP3p | 0 | 75 | idSL01c | 4 |
| 23 | VUVc | 0 | 50 | idSL00p | 5 | 76 | idSL01c | 3 |
| 24 | LSP4c | 0 | 51 | idSL00p | 4 | 77 | idSL01c | 2 |
| 25 | idGL00c | 3 | Class IV Bit ||| 78 | idSL01c | 1 |
| 26 | idGL00c | 2 | 52 | LSP2c | 2 | 79 | idSL01c | 0 |
| 27 | idGL00c | 1 | 53 | LSP2c | 1 | | | |

FIG.11

| Voiced sound | | | | | |
| --- | --- | --- | --- | --- | --- |
| No. | Item | Bit | No. | Item | Bit |
| Class I Bit | | | 34 | VUVc | 0 |
| 0 | VUVp | 1 | 35 | LSP4c | 0 |
| 1 | VUVp | 0 | 36 | idG0c | 4 |
| 2 | LSP4p | 0 | 37 | idG0c | 3 |
| 3 | idG0p | 4 | 38 | idG0c | 2 |
| 4 | idG0p | 3 | 39 | idG0c | 1 |
| 5 | idG0p | 2 | 40 | idG0c | 0 |
| 6 | idG0p | 1 | 41 | LSP0c | 4 |
| 7 | idG0p | 0 | 42 | LSP0c | 3 |
| 8 | LSP0p | 4 | 43 | LSP0c | 2 |
| 9 | LSP0p | 3 | 44 | LSP0c | 1 |
| 10 | LSP0p | 2 | 45 | LSP0c | 0 |
| 11 | LSP0p | 1 | 46 | PCHc | 6 |
| 12 | LSP0p | 0 | 47 | PCHc | 5 |
| 13 | PCHp | 6 | 48 | PCHc | 4 |
| 14 | PCHp | 5 | 49 | PCHc | 3 |
| 15 | PCHp | 4 | 50 | PCHc | 2 |
| 16 | PCHp | 3 | 51 | PCHc | 1 |
| 17 | PCHp | 2 | 52 | LSP2c | 6 |
| 18 | PCHp | 1 | 53 | LSP2c | 5 |
| 19 | LSP2p | 6 | 54 | LSP2c | 4 |
| 20 | LSP2p | 5 | 55 | LSP2c | 3 |
| 21 | LSP2p | 4 | 56 | idS0_4kc | 6 |
| 22 | LSP2p | 3 | 57 | idS0_4kc | 5 |
| 23 | idS0_4kp | 6 | 58 | idS0_4kc | 4 |
| 24 | idS0_4kp | 5 | 59 | idS0_4kc | 3 |
| 25 | idS0_4kp | 4 | 60 | idS0_4kc | 2 |
| 26 | idS0_4kp | 3 | 61 | LSP3c | 4 |
| 27 | idS0_4kp | 2 | 62 | LSP5c | 7 |
| 28 | LSP3p | 4 | 63 | idS1_4kc | 9 |
| 29 | LSP5p | 7 | 64 | idS2_4kc | 8 |
| 30 | idS1_4kp | 9 | 65 | idS3_4kc | 5 |
| 31 | idS2_4kp | 8 | | | |
| 32 | idS3_4kp | 5 | | | |
| 33 | VUVc | 1 | | | |

FIG.12

| Voiced sound |||||||
|---|---|---|---|---|---|
| No. | Item | Bit | No. | Item | Bit |
| Class II Bit ||| 96 | idS1_4kc | 0 |
| 66 | idS1_4kp | 8 | 97 | idS2_4kc | 7 |
| 67 | idS1_4kp | 7 | 98 | idS2_4kc | 6 |
| 68 | idS1_4kp | 6 | 99 | idS2_4kc | 5 |
| 69 | idS1_4kp | 5 | 100 | idS2_4kc | 4 |
| 70 | idS1_4kp | 4 | 101 | idS2_4kc | 3 |
| 71 | idS1_4kp | 3 | 102 | idS2_4kc | 2 |
| 72 | idS1_4kp | 2 | 103 | idS2_4kc | 1 |
| 73 | idS1_4kp | 1 | 104 | idS2_4kc | 0 |
| 74 | idS1_4kp | 0 | 105 | idS3_4kc | 4 |
| 75 | idS2_4kp | 7 | 106 | idS3_4kc | 3 |
| 76 | idS2_4kp | 6 | 107 | idS3_4kc | 2 |
| 77 | idS2_4kp | 5 | 108 | idS3_4kc | 1 |
| 78 | idS2_4kp | 4 | 109 | idS3_4kc | 0 |
| 79 | idS2_4kp | 3 | Class III Bit |||
| 80 | idS2_4kp | 2 | 110 | idS0p | 3 |
| 81 | idS2_4kp | 1 | 111 | idS0p | 2 |
| 82 | idS2_4kp | 0 | 112 | idS0p | 1 |
| 83 | idS3_4kp | 4 | 113 | idS0p | 0 |
| 84 | idS3_4kp | 3 | Class IV Bit |||
| 85 | idS3_4kp | 2 | 114 | idS1p | 3 |
| 86 | idS3_4kp | 1 | 115 | idS1p | 2 |
| 87 | idS3_4kp | 0 | 116 | idS1p | 1 |
| 88 | idS1_4kc | 8 | 117 | idS1p | 0 |
| 89 | idS1_4kc | 7 | Class V Bit |||
| 90 | idS1_4kc | 6 | 118 | idS0c | 3 |
| 91 | idS1_4kc | 5 | 119 | idS0c | 2 |
| 92 | idS1_4kc | 4 | 120 | idS0c | 1 |
| 93 | idS1_4kc | 3 | 121 | idS0c | 0 |
| 94 | idS1_4kc | 2 ||||
| 95 | idS1_4kc | 1 ||||

FIG.13

| \multicolumn{6}{c|}{Voiced sound} |
|---|---|---|---|---|---|
| No. | Item | Bit | No. | Item | Bit |
| \multicolumn{3}{c|}{Class VI Bit} | \multicolumn{3}{c|}{Class VII Bit} |
| 122 | idS1c | 3 | 140 | PCHp | 0 |
| 123 | idS1c | 2 | 141 | idS0_4kp | 1 |
| 124 | idS1c | 1 | 142 | idS0_4kp | 0 |
| 125 | idS1c | 0 | 143 | LSP2c | 2 |
| \multicolumn{3}{c|}{Class VII Bit} | 144 | LSP2c | 1 |
| 126 | LSP2p | 2 | 145 | LSP2c | 0 |
| 127 | LSP2p | 1 | 146 | LSP3c | 3 |
| 128 | LSP2p | 0 | 147 | LSP3c | 2 |
| 129 | LSP3p | 3 | 148 | LSP3c | 1 |
| 130 | LSP3p | 2 | 149 | LSP3c | 0 |
| 131 | LSP3p | 1 | 150 | LSP5c | 6 |
| 132 | LSP3p | 0 | 151 | LSP5c | 5 |
| 133 | LSP5p | 6 | 152 | LSP5c | 4 |
| 134 | LSP5p | 5 | 153 | LSP5c | 3 |
| 135 | LSP5p | 4 | 154 | LSP5c | 2 |
| 136 | LSP5p | 3 | 155 | LSP5c | 1 |
| 137 | LSP5p | 2 | 156 | LSP5c | 0 |
| 138 | LSP5p | 1 | 157 | PCHc | 0 |
| 139 | LSP5p | 0 | 158 | idS0_4kc | 1 |
|  |  |  | 159 | idS0_4kc | 0 |

FIG.14

| Unvoiced sound |||||||
|---|---|---|---|---|---|
| No. | Item | Bit | No. | Item | Bit |
| Class I Bit ||| 34 | VUVc | 0 |
| 0 | VUVp | 1 | 35 | LSP4c | 0 |
| 1 | VUVp | 0 | 36 | idGL00c | 3 |
| 2 | LSP4p | 0 | 37 | idGL00c | 2 |
| 3 | idGL00p | 3 | 38 | idGL00c | 1 |
| 4 | idGL00p | 2 | 39 | idGL00c | 0 |
| 5 | idGL00p | 1 | 40 | idGL01c | 3 |
| 6 | idGL00p | 0 | 41 | idGL01c | 2 |
| 7 | idGL01p | 3 | 42 | idGL01c | 1 |
| 8 | idGL01p | 2 | 43 | idGL01c | 0 |
| 9 | idGL01p | 1 | 44 | LSP0c | 4 |
| 10 | idGL01p | 0 | 45 | LSP0c | 3 |
| 11 | LSP0p | 4 | 46 | LSP0c | 2 |
| 12 | LSP0p | 3 | 47 | LSP0c | 1 |
| 13 | LSP0p | 2 | 48 | LSP0c | 0 |
| 14 | LSP0p | 1 | 49 | LSP2c | 6 |
| 15 | LSP0p | 0 | 50 | LSP2c | 5 |
| 16 | LSP2p | 6 | 51 | LSP2c | 4 |
| 17 | LSP2p | 5 | 52 | LSP2c | 3 |
| 18 | LSP2p | 4 | 53 | LSP3c | 4 |
| 19 | LSP2p | 3 | 54 | LSP5c | 7 |
| 20 | LSP3p | 4 | 55 | idGL10c | 2 |
| 21 | LSP5p | 7 | 56 | idGL10c | 1 |
| 22 | idGL10p | 2 | 57 | idGL10c | 0 |
| 23 | idGL10p | 1 | 58 | idGL11c | 2 |
| 24 | idGL10p | 0 | 59 | idGL11c | 1 |
| 25 | idGL11p | 2 | 60 | idGL11c | 0 |
| 26 | idGL11p | 1 | 61 | idGL12c | 2 |
| 27 | idGL11p | 0 | 62 | idGL12c | 1 |
| 28 | idGL12p | 2 | 63 | idGL12c | 0 |
| 29 | idGL12p | 1 | 64 | idGL13c | 2 |
| 30 | idGL12p | 0 | 65 | idGL13c | 1 |
| 31 | idGL13p | 2 ||||
| 32 | idGL13p | 1 ||||
| 33 | VUVc | 1 ||||

FIG.15

| \multicolumn{6}{c}{Unvoiced sound} | | | | | |
|---|---|---|---|---|---|
| No. | Item | Bit | No. | Item | Bit |
| Class II Bit | | | 90 | LSP2c | 1 |
| 66 | idGL13p | 0 | 91 | LSP2c | 0 |
| 67 | LSP2p | 2 | 92 | LSP3c | 3 |
| 68 | LSP2p | 1 | 93 | LSP3c | 2 |
| 69 | LSP2p | 0 | 94 | LSP3c | 1 |
| 70 | LSP3p | 3 | 95 | LSP3c | 0 |
| 71 | LSP3p | 2 | 96 | LSP5c | 6 |
| 72 | LSP3p | 1 | 97 | LSP5c | 5 |
| 73 | LSP3p | 0 | 98 | LSP5c | 4 |
| 74 | LSP5p | 6 | 99 | LSP5c | 3 |
| 75 | LSP5p | 5 | 100 | LSP5c | 2 |
| 76 | LSP5p | 4 | 101 | LSP5c | 1 |
| 77 | LSP5p | 3 | 102 | LSP5c | 0 |
| 78 | LSP5p | 2 | 103 | idSL00c | 5 |
| 79 | LSP5p | 1 | 104 | idSL00c | 4 |
| 80 | LSP5p | 0 | 105 | idSL00c | 3 |
| 81 | idSL00p | 5 | 106 | idSL00c | 2 |
| 82 | idSL00p | 4 | 107 | idSL00c | 1 |
| 83 | idSL00p | 3 | 108 | idSL00c | 0 |
| 84 | idSL00p | 2 | 109 | idSL01c | 5 |
| 85 | idSL00p | 1 | Class III Bit | | |
| 86 | idSL00p | 0 | 110 | idSL01p | 4 |
| 87 | idSL01p | 5 | 111 | idSL01p | 3 |
| 88 | idGL13c | 0 | 112 | idSL01p | 2 |
| 89 | LSP2c | 2 | 113 | idSL01p | 1 |

FIG.16

| No. | Item | Bit | No. | Item | Bit |
|---|---|---|---|---|---|
| Unvoiced sound ||||||
| Class IV Bit ||| 136 | idSL12p | 1 |
| 114 | idSL01p | 0 | 137 | idSL12p | 0 |
| 115 | idSL10p | 4 | 138 | idSL13p | 4 |
| 116 | idSL10p | 3 | 139 | idSL13p | 3 |
| 117 | idSL10p | 2 | 140 | idSL13p | 2 |
| Class V Bit ||| 141 | idSL13p | 1 |
| 118 | idSL01c | 4 | 142 | idSL13p | 0 |
| 119 | idSL01c | 3 | 143 | idSL10c | 1 |
| 120 | idSL01c | 2 | 144 | idSL10c | 0 |
| 121 | idSL01c | 1 | 145 | idSL11c | 4 |
| Class VI Bit ||| 146 | idSL11c | 3 |
| 122 | idSL01c | 0 | 147 | idSL11c | 2 |
| 123 | idSL10c | 4 | 148 | idSL11c | 1 |
| 124 | idSL10c | 3 | 149 | idSL11c | 0 |
| 125 | idSL10c | 2 | 150 | idSL12c | 4 |
| Class VII Bit ||| 151 | idSL12c | 3 |
| 126 | idSL10p | 1 | 152 | idSL12c | 2 |
| 127 | idSL10p | 0 | 153 | idSL12c | 1 |
| 128 | idSL11p | 4 | 154 | idSL12c | 0 |
| 129 | idSL11p | 3 | 155 | idSL13c | 4 |
| 130 | idSL11p | 2 | 156 | idSL13c | 3 |
| 131 | idSL11p | 1 | 157 | idSL13c | 2 |
| 132 | idSL11p | 0 | 158 | idSL13c | 1 |
| 133 | idSL12p | 4 | 159 | idSL13c | 0 |
| 134 | idSL12p | 3 ||||
| 135 | idSL12p | 2 ||||

FIG.17

|  | 2kbps source coder | 4kbps source coder |
|---|---|---|
| Class I | | |
| Audio Frame | 44 | 66 |
| CRC parity | 6 | 6 |
| Code Rate | 8/16 | 8/16 |
| Class I total | 100 | 144 |
| Class II | | |
| Audio Frame | 4 | 44 |
| CRC parity | 1 | 6 |
| Code Rate | 8/8 | 8/8 |
| Class II total | 5 | 50 |
| Class III | | |
| Audio Frame | 4 | 4 |
| CRC parity | 1 | 1 |
| Code Rate | 8/8 | 8/8 |
| Class III total | 5 | 5 |
| Class IV | | |
| Audio Frame | 4 | 4 |
| CRC parity | 1 | 1 |
| Code Rate | 8/8 | 8/8 |
| Class IV total | 5 | 5 |
| Class V | | |
| Audio Frame | 4 | 4 |
| CRC parity | 1 | 1 |
| Code Rate | 8/8 | 8/8 |
| Class V total | 5 | 5 |
| Class VI | | |
| Audio Frame | 20 | 4 |
| CRC parity | 0 | 1 |
| Code Rate | 8/8 | 8/8 |
| Class VI total | 20 | 5 |
| Class VII | | |
| Audio Frame | | 34 |
| CRC parity | | 0 |
| Code Rate | | 8/8 |
| Class VII total | | 34 |
| Total Bit of All Classes | 140 | 248 |
| Bit rate | 3.5kbps | 6.2kbps |

FIG.18

| frame | p |
|---|---|
| 0 | 0.7 |
| 1 | 0.8 |
| 2 | 0.5 |
| 3 | 0.4 |
| 4 | 0.3 |
| 5 | 0.2 |
| 6 | 0.1 |
| $\geq 7$ | 0.0 |

FIG.20

| state | mute |
|---|---|
| 0 | 1.000 |
| 1 | 0.800 |
| 2 | 0.700 |
| 3 | 0.500 |
| 4 | 0.250 |
| 5 | 0.125 |
| 6 | 0.000 |
| 7 | Average/0.800 |

FIG.21

| i | 1 | 2 | 3 | 4 | 5 | 6 | 7..44 |
|---|---|---|---|---|---|---|---|
| s[i] | 0.10 | 0.25 | 0.40 | 0.55 | 0.70 | 0.85 | 1.00 |

FIG.22

DECODING METHOD AND APPARATUS AND PROGRAM FURNISHING MEDIUM

BACKGROUND OF THE INVENTION

1. Field of the Invention

This invention relates to a method and apparatus for decoding encoding parameters selectively protected against errors produced in a transmission path, and a program furnishing medium.

2. Description of Related Art

There are known a variety of encoding methods for doing signal compression by exploiting statistic properties in the time domain and in the frequency domain of audio signals, including the speech and acoustic signals, and psychoacoustic properties of the human being. As these encoding methods, VSELP (Vector Sum Excited Linear Prediction) encoding system or the PSI-CELP (Pitch Synchronous Innovation—CELP), classified under the so-called CELP (Code Excited Linear Prediction) encoding system, is attracting attention as being a low bit rate speech encoding system.

In the waveform encoding system, such as this CELP encoding system, input speech signals are formed into blocks or frames, with a pre-set number of samples of the input speech signals as an encoding unit, and a closed loop search of an optimum vector is performed using an analysis by synthesis method on the block- or frame-based time-domain speech waveform to execute vector quantization of the waveform to output the vector index.

Meanwhile, the code bits, obtained with the speech encoding system with a low bitrate, such as 2 kbps or 4 kbps, are widely used in communication, computer or broadcasting as general audio not constrained by specified audio information contents. Therefore, these code bits need to be protected strongly against errors produced on the transmission path.

If an error is produced in succession on the transmission path, sound dropout occurs in succession for long time in speech decoding, thus lowering the speech quality.

The present inventors have clarified, in Japanese Laying-Open Patent H-11-122120, an encoding method and apparatus and a decoding method and apparatus which is strong against errors occurring on the transmission path to enable the sound quality to be improved appreciably.

In this encoding method and apparatus, the input speech signal is divided on the time axis every pre-set encoding unit and encoded from one encoding unit to another to output plural sorts of the encoding speech parameters. Of these plural sorts of the encoding speech parameters, a psychoacoustically crucial bit group is selected and, from this crucial bit group, an error check code is generated. This error check code and the crucial bit group are subjected to convolution coding to enable protection of the psychoacoustically crucial bit groups from errors occurring on the transmission path.

For decoding the transmitted encoded data, produced on convolution encoding of the error check code and the crucial bit group and on merging to the bit group excluding the crucial bit group, the decoding method and apparatus process the convolution coded output with coevolution decoding, convolution decode the crucial bit group, added to with the error check code, and the bit group excluding the crucial bit group, output the convolution decoded output, check the transmission error using the error check code appended to the convolution decoded output, adjust the convolution decoded output depending on the result of the error check and process the adjusted convolution decoded output with speech decoding, thus enabling decoding of the speech such as to suppress the lowering of the sound quality due to errors occurring on transmission paths.

Meanwhile, in the above-described decoding method and apparatus, it is necessary to maintain signal continuity as speech signals following the speech decoding when adjusting the decoded output responsive to the results of error detection as to transmission errors using the error check code appended to the convolution decoded output.

SUMMARY OF THE INVENTION

It is therefore an object of the present invention to provide a decoding method and apparatus and a program furnishing medium whereby signal continuity as speech signals signal may be maintained to enable decoding of the high quality speech.

In one aspect, the present invention provides a decoding apparatus for decoding transmitted encoded parameters corresponding to input speech signals which have been encoded by an encoding device from one pre-set encoding unit on the time axis to another and which have been classed depending on the psychoacoustic sensitivity of bits to transmission path errors, wherein the decoding apparatus includes transmission path decoding means for detecting an error using an error check code appended to the encoding parameters of a pre-set class and providing for different frame masking processing depending on errors in the encoding parameters produced in the encoding unit.

Preferably, the encoding processing in the encoding device is performed using a plurality of vector quantizers, an index representing each code vector is classified according to psychoacoustic sensitivity of bits against transmission path errors and is transmitted in this classified state. The transmission path decoding means detects the error check codes appended to the index of a pre-set class to provide for different frame masking processing depending on an index error produced in the encoding unit.

Preferably, the encoding processing in the encoding device is performed using a multi-stage vector quantizer prepared by alternate learning, and an index representing each code vector is classified according to psychoacoustic sensitivity of bits against transmission path errors and is transmitted in this classified state. The transmission path decoding means detects the error check codes appended to the index of a pre-set class to provide for different frame masking processing depending on whether or not an error has been detected in plural indexes.

In another aspect, the present invention provides a decoding method for decoding transmitted encoded parameters corresponding to input speech signals which have been encoded by an encoding device from one pre-set encoding unit on the time axis to another and which have been classed depending on the psychoacoustic sensitivity of bits to transmission path errors, wherein the decoding method includes a transmission path decoding step of detecting an error using an error check code appended to the encoding parameters of a pre-set class and providing for different frame masking processing depending on errors in the encoding parameters produced in the encoding unit.

Preferably, the encoding processing in the encoding device is performed using a plurality of vector quantizers, an index representing each code vector is classified according to psychoacoustic sensitivity of bits against transmission path errors and is transmitted in this classified state. The transmission path decoding step detects the error check codes appended to the index of a pre-set class to provide for different frame masking processing depending on an index error produced in the encoding unit.

Preferably, the encoding processing in the encoding device is performed using a multi-stage vector quantizer prepared by alternate learning, and an index representing each code vector is classified according to psychoacoustic sensitivity of bits against transmission path errors and is transmitted in this classified state. The transmission path decoding means detects the error check codes appended to the index of a pre-set class to provide for different frame masking processing depending on whether or not an error has been detected in plural indexes.

In still another aspect, the present invention provides a program furnishing medium for furnishing a program for decoding transmitted encoded parameters corresponding to input speech signals which have been encoded by an encoding device from one pre-set encoding unit on the time axis to another and which have been classed depending on the psychoacoustic sensitivity of bits to transmission path errors, wherein the program includes a transmission path decoding step of detecting an error using an error check code appended to the encoding parameters of a pre-set class and providing for different frame masking processing depending on errors in the encoding parameters produced in the encoding unit.

Preferably, the encoding processing in the encoding device is performed using a plurality of vector quantizers, an index representing each code vector is classified according to psychoacoustic sensitivity of bits against transmission path errors and is transmitted in this classified state, wherein the transmission path decoding step detects the error check codes appended to the index of a pre-set class to provide for different frame masking processing depending on an index error produced in the encoding unit.

Preferably, the encoding processing in the encoding device is performed using a multi-stage vector quantizer prepared by alternate learning, and wherein an index representing each code vector is classified according to psychoacoustic sensitivity of bits against transmission path errors and is transmitted in this classified state. The transmission path decoding means detects the error check codes appended to the index of a pre-set class to provide for different frame masking processing depending on whether or not an error has been detected in plural indexes.

In the decoding method and apparatus of the present invention, it is possible to keep continuity as speech signals to decode the speech of high sound quality.

With the use of the program furnishing medium of the present invention, it is possible to maintain continuity of speech signals in a computer system to decode the speech of high sound quality.

BRIEF DESCRIPTION OF THE DRAWINGS

FIG. 4 shows parameters common to bitrates of 2 and 4 kbps.

FIG. 5 shows parameters proper only to 4 kbps.

FIG. 6 shows class division of voiced speech parameters with the bitrate of 2 kbps.

FIG. 7 shows class division of unoiced sound parameters with the bitrate of 2 kbps.

FIG. 8 shows class division of voiced speech parameters with the bitrate of 4 kbps.

FIG. 9 shows class division of unoiced sound parameters with the bitrate of 4 kbps.

FIG. 10 shows an inputting sequence of voiced speech parameters to a channel coder with the bitrate of 2 kbps.

FIG. 11 shows an inputting sequence of unoiced sound parameters to a channel coder with the bitrate of 2 kbps.

FIG. 12 shows an inputting sequence of voiced speech parameters to a class I bit channel coder with the bitrate of 4 kbps.

FIG. 13 shows an inputting sequence of voiced speech parameters to class II to V bit channel coder with the bitrate of 4 kbps.

FIG. 14 shows an inputting sequence of voiced speech parameters to class VI and class VII bit channel coder with the bitrate of 4 kbps.

FIG. 15 shows an inputting sequence of unvoiced sound parameters to a class I bit channel coder with the bitrate of 4 kbps.

FIG. 16 shows an inputting sequence of unvoiced sound parameters to a class II to class V bit channel coder with the bitrate of 4 kbps.

FIG. 17 shows an inputting sequence of unvoiced sound parameters to class VI and class VII channel coder with the bitrate of 4 kbps.

FIG. 18 shows bit assignment of the class I to VI of the voiced speech of 2 kbps and the class II to VII of the voiced sound of 4 kbps.

FIG. 20 shows the values of interpolation coefficients P used in the equation (7).

FIG. 21 illustrates the setting of mute variable mute used for controlling the sound volume of an output speech responsive to the value of the state variable state.

FIG. 22 shows values of s[i] used in the equation (10).

DESCRIPTION OF THE PREFERRED EMBODIMENTS

Figure 1:
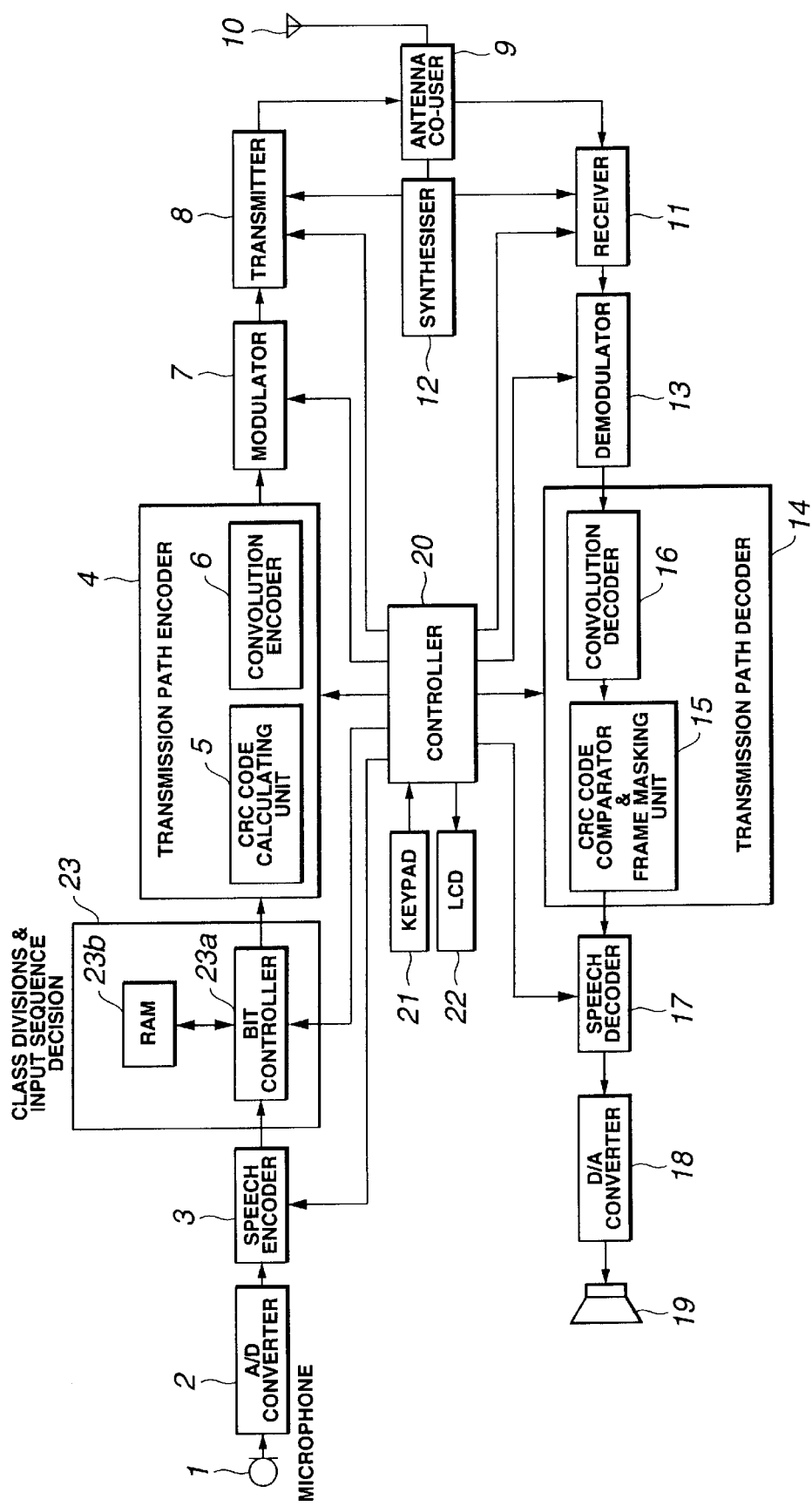
FIG. 1 is a block diagram showing the structure of a portable telephone device embodying the present invention.

Referring to the drawings, preferred embodiments of the present invention will be explained in detail. The illustrated embodiment is directed to a portable telephone device having a decoding device as specified example of the decoding method and apparatus of the present invention, as shown in FIG. 1. This portable telephone device also includes an encoder device for encoding the speech with a low bitrate of, for example, 2 or 4 kbps.

The encoding device splits an input speech signal every encoding unit on the time axis and encodes the speech signal from one encoding unit to another to generate plural sorts of the speech encoding parameters. The bits are allotted to plural protective classes, depending on the psychoacoustic sensitivity of bits to transmission path errors of the speech encoding parameters. For example, if the bitrate is 2 kbps or 4 kbps, the bits are allocated to 6 and 7 classes, respectively. The class allocation and speech encoding parameters will be explained in detail subsequently.

First, the encoding device of the present portable telephone device includes a speech encoder 3, a class division and inputting sequence decision unit 23 and a transmission path encoder 4. The speech encoder 3 splits the input speech signal on the time axis in terms of a pre-set encoding unit and encodes the input signal every encoding unit to output plural sorts of the speech encoding parameters. The class division and inputting sequence decision unit 23 classifies the plural sorts of the speech encoding parameters from the speech encoder 3 into 6 and 7 classes, if the bitrate is 2 kbps or 4 kbps, respectively, depending on the psychoacoustic sensitivity of the bits to transmission path errors, while determining the bit inputting sequence to the transmission path encoder 4 of the next stage. The transmission path encoder 4 generates CRC (cyclic redundancy check) codes, depending on the classes obtained by the class division and inputting sequence decision unit 23, and on the bit inputting sequence, and applies the CRC codes to the bits. The transmission path encoder 4 occasionally applies convolution coding to the bits in addition to the CRC codes by way of protection. The transmission path encoder 4 occasionally performs no protection.

The class division and inputting sequence decision unit 23 includes a bit controller 23a and a RAM 23b. The bit controller 23a classifies the plural sorts of the speech encoding parameters from the speech encoder 3 depending on the psychoacoustic sensitivity of the bits to transmission path errors, using the RAM 23b as a work area, while determining the bit inputting sequence.

The transmission path encoder 4 includes a CRC code calculating unit 5 and a convolution encoder 6. The CRC code calculating unit 5 generates CRC (cyclic redundancy check) code. The convolution encoder 6 occasionally applies the convolution coding to the bit group, to which the CRC code has been appended in the CRC code calculating unit 5. The transmission path encoder 4 occasionally simply outputs the bit group, to which has been appended the CRC code from the CRC code calculating unit 5. The transmission path encoder 4 may also transmits the bit group without doing any processing thereon, depending on the class.

In the portable telephone device, the decoding device, employing the decoding method and apparatus according to the present invention, includes a convolution decoder 16, adapted for convolution decoding the crucial bit group, having the error correction code simply appended thereto, and the bit group, excluding the crucial bit group, and for outputting the result of the convolution decoding, and a CRC code comparator-frame masking unit 15 for comparing the CRC code appended to the convolution decoded output of the convolution decoder 16 to the CRC code calculated from the bit group excluding the crucial bit group to adjust the convolution decoded output. The decoding device also includes a speech decoder 17 for speech decoding the convolution decoded output of the CRC code comparator-frame masking unit 15.

In the present portable telephone device, the speech signals, inputted in transmission at a microphone 1, is converted by an A/D converter 2 into digital signals, which then are encoded by the speech encoder 3 into encoded parameters of a low bitrate of 2 kbps/4 kbps. These encoded parameters are processed by the class division and inputting sequence decision unit 23 for classification and inputting sequence decision. The parameters from the class division and inputting sequence decision unit 23 are routed to the transmission path encoder 4 where the parameters are encoded such that the quality of the transmission path is less liable to affect the speech quality. The encoded parameters are then modulated by a modulator 7 and thereby processed into output bits which are transmitted through an antenna co-user 9 from an antenna 10.

During reception, the electrical waves, captured by the antenna 10, are received through the antenna co-user 9 by a receiver 11 and demodulated by a demodulator 13 so as to be then corrected for transmission errors by the speech encoder 17 and converted by a D/A converter 18 back into analog speech signals which are outputted at a speaker 19.

A controller 20 controls the above-mentioned various portions, whilst a synthesizer 12 imparts the transmission/reception frequency to a transmitter 8 and the receiver 11. A key-pad 21 and an LCD indicator 22 are utilized as a man-machine interface.

In the above-described portable telephone device, the CRC code calculating unit 5 constituting the transmission path encoder 4, selects part or all of line spectrum pair (LSP) parameters, generally defining the shape of the frequency spectrum of the speech signals, classified and having its inputting sequence determined in the class division and inputting sequence decision unit 23, all of voiced (V)/unvoiced (UV) decision parameters indicating whether the speech signals are voiced (V) or unvoiced (UV), part or all of pitch parameters when the speech signals are voiced sound, part or all of the spectrum codebook index and gain index indicating the spectrum envelope of residual signals of linear prediction coding (LPC) when the speech signals are voiced sound, and part or all of the noise codebook index and the gain codebook index of residual signals of linear prediction coding (LPC) when the speech signals are unvoiced sound, to generate CRC codes therefrom.

These speech encoding parameters are acquired in the speech encoder 3. The speech encoding method, carried out by the speech encoder 3, includes a short prediction residue calculating step of finding short prediction residuals of the input speech signal, a sine wave analysis encoding step of sine wave analyzing and encoding the calculated short term prediction errors, and a waveform encoding step of encoding the input speech signal by waveform encoding. This speech encoder 3 is now explained with reference to FIGS. 2 and 3.

Figure 2:
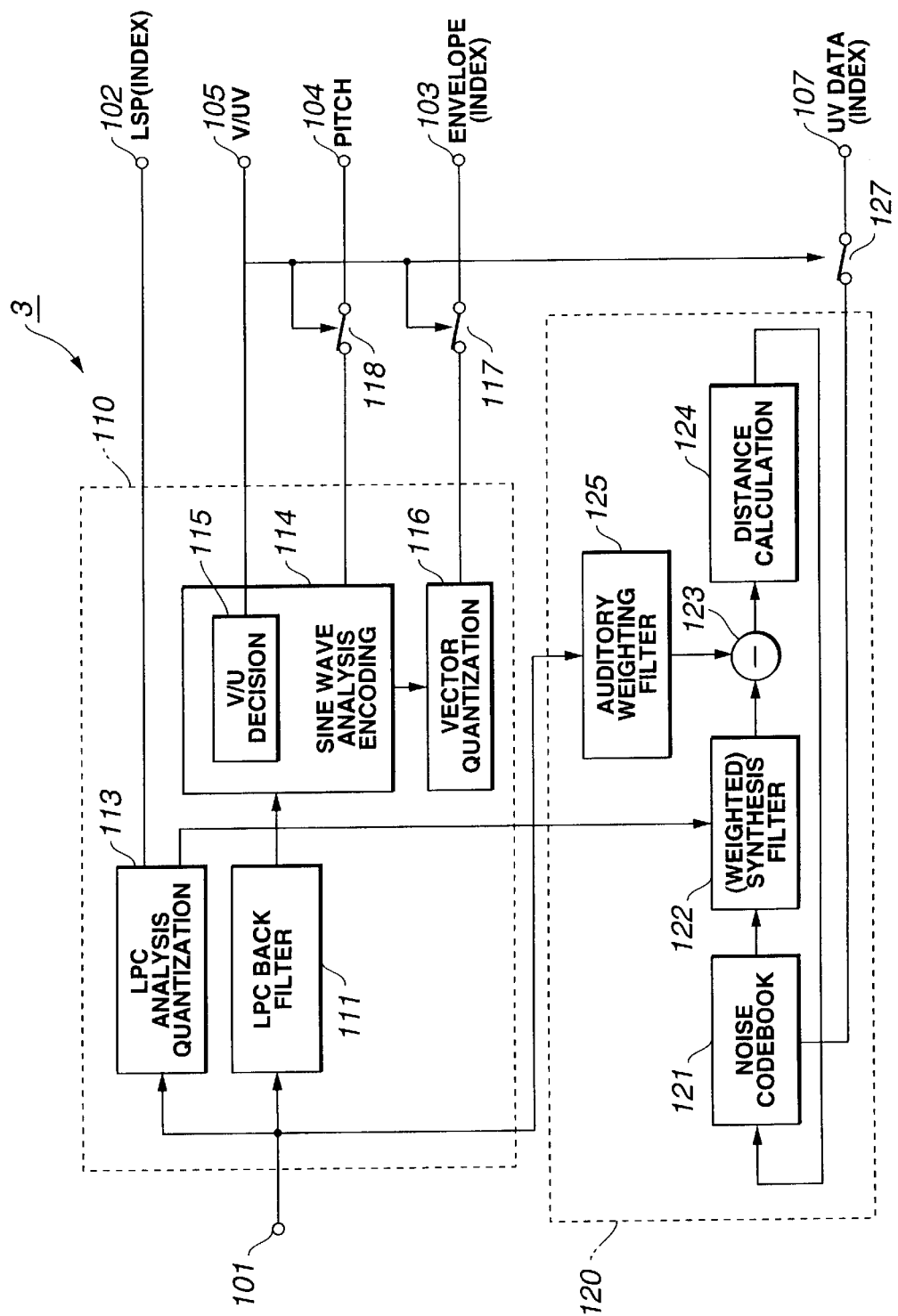
FIG. 2 is a block diagram showing a basic structure of s speech encoder constituting the portable telephone device.

The basic concept of the speech encoder 3 of FIG. 2 resides in employing a first encoding unit 110 for finding short term prediction errors, such as LPC (linear prediction coding) residuals, of input speech signals, to execute sinusoidal analysis encoding, such as harmonic coding, and a second encoding unit 120, for encoding the input speech signal by waveform coding exhibiting phase reproducibility with respect to the input speech signal, and in employing the first encoding unit 110 and the second encoding unit 120 for encoding the voiced (V) portion and the unvoiced (UV) portion of the input speech signal, respectively.

The first encoding unit 110 employs a configuration of performing sinusoidal analysis encoding, such as harmonic encoding or multi-band excitation (MBE) encoding, on the LPC residuals. The second encoding unit 120 uses the configuration of the code excited linear prediction (CELP) coding employing the vector quantization by a closed loop search of an optimum vector by e.g., an analysis by synthesis method.

In an example of FIG. 2, the speech signal sent to an input terminal 101 is routed to a LPC inverse filter 111 and an LPC analysis quantization unit 113 of the first encoding unit 110. The LPC coefficients, or so-called a-parameter, acquired from the LPC analysis quantization unit 113, is sent to the LPC inverse filter 111 from which linear prediction residuals (LPC residuals) of the input speech signal are recovered. From the LPC analysis quantization unit 113, a quantized output of the LSP (line spectrum pair) is taken out and sent to an output terminal 102. The LPC residuals from the LPC inverse filter 111 are sent to a sinusoidal analysis encoding unit 114, adapted for executing pitch detection, calculations of the spectral envelope amplitudes and V/UV decision by a V/UV (voiced/unvoiced) decision unit 115. The spectral envelope amplitude data from the sinusoidal analysis encoding unit 114 are sent to a vector quantization unit 116. The codebook index from the vector quantization unit 116 as a vector quantization output of the spectral envelope is sent via a switch 117 to the output terminal 103. An output of the sinusoidal analysis encoding unit 114 is sent via switch 118 to the output terminal 103. A V/UV decision output from the V/UV decision unit 115 is sent to the output terminal 105, while also being sent to switches 117, 118 as control signals therefor, so that, if the input speech signal is voiced (V), the index and the pitch are selected and taken out at the output terminals 103, 104, respectively.

The second encoding unit 120 of FIG. 2 has a code excited linear prediction (CELP) coding structure and executes vector quantization of the time domain waveform by a closed loop search method consisting in synthesizing an output of a noise codebook 121 by a weighted synthesis filter 122, routing the resulting weighted speech to a subtractor 123 to take out an error thereof from the speech supplied to the input terminal 101 and passed through a psychoacoustic weighting filter 125, and in sending the error to a distance calculating circuit 124 to calculate the distance and searching a vector which will minimize the error. The CELP encoding is used for encoding the unvoiced speech portion the codebook index, as the UV data from the CELP encoding, is taken out at an output terminal 107 through a switch 127 which is turned on when the result of V/UV decision from the V/UV decision unit 115 indicates unvoiced (UV) sound.

Figure 3:
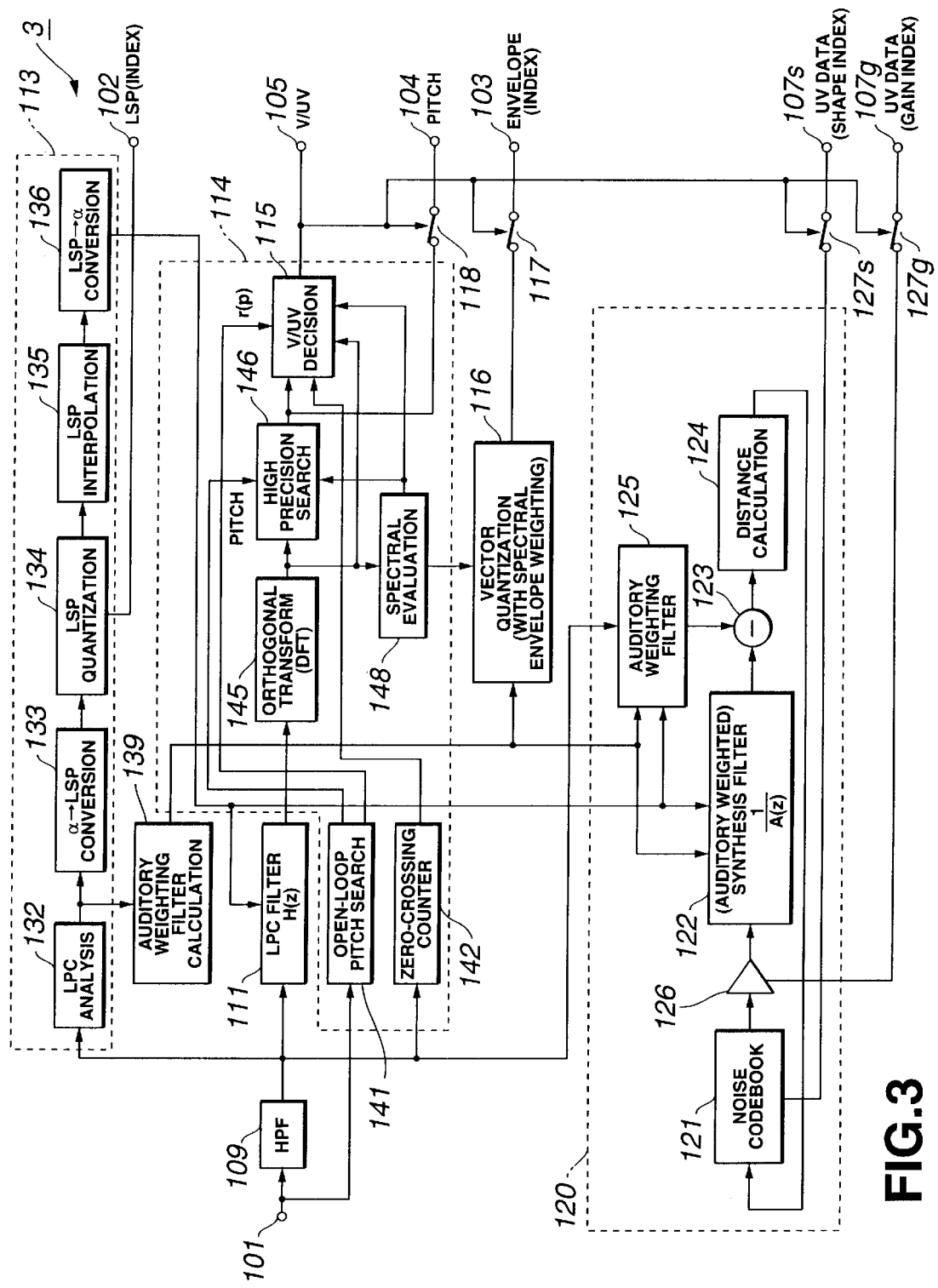
FIG. 3 is a block diagram showing a detailed structure of the speech encoder.

FIG. 3 shows a more detailed structure of the speech encoder 3. In FIG. 3, parts or components corresponding to those of FIG. 2 are indicated by the same reference numerals.

In the speech encoder 3, shown in FIG. 3, the speech signal supplied to the input terminal 101 is filtered by a high-pass filter (HPF) 109 to remove signals of an unneeded frequency range. The filtered output is sent to an LPC analysis circuit 132 of an LPC (linear prediction coding) analysis quantization unit 113 and to an LPC back-filtering circuit 111.

The LPC analysis circuit 132 of the LPC analysis quantization unit 113 applies the Hamming window, with a length of the input signal waveform on the order of 256 samples as a block, to find linear prediction coefficients by an autocorrelation method, that is a so-called α-parameters. The framing interval as a data outputting unit is on the order of 160 samples. With the sampling frequency fs of, for example, 8 kHz, the frame interval is 160 samples or 20 msec.

38. The α-parameter from the LPC analysis circuit 132 is sent to an α-LSP conversion circuit 133 for conversion to a line spectrum pair (LSP) parameter. This converts α-parameters, found as straight type filter coefficients, into e.g., ten, that is five pairs, of LSP parameters. The conversion is by e.g., the Newton-Rhapson method. The reason for doing conversion into LSP parameters is that the LSP parameters are superior in interpolation characteristics to α-parameters.

The LSP parameters from the α-LSP converson circuit 133 are matrix- or vector-quantized by the LSP quantizer 134. In this case, the interframe difference is taken prior to vector quantization, or plural frames are taken together and subjected to matrix quantization. Here, two frames of LSP parameters, calculated every 20 msec, with a frame being 20 msec, are taken together and subjected to matrix quantization and to vector quantization.

A quantized output of an LSP quantizer 134, that is the index of LSP quantization, is taken out at a terminal 102, while the quantized LSP vector is sent to an LSP interpolation circuit 136.

The LSP interpolation circuit 136 interpolates the LSP vector, quantized every 20 msec or every 40 msec, to raise the sampling rate by a factor of eight, so that the LSP vector will be updated every 2.5 msec. The reason is that, if the residual waveform is analysis-synthesized by the harmonic encoding/decoding method, the envelope of the synthesized waveform is extremely smooth, such that, if the LPC coefficients are changed extremely rapidly, extraneous sounds tend to be produced. That is, if the LPC coefficients are changed only gradually every 2.5 msec, such extraneous sound can be prevented from being produced.

For executing the back-filtering if the input speech using the interpolated 2.5 msec based LSP vector, the LSP parameter is converted by an LSP→α conversion circuit 137 into α-parameters which are coefficients of a straight type filter with an order of the order of ten. An output of the LSP→α conversion circuit 137 is sent to the LPC back-filtering circuit 111 where back-filtering is carried out with the α-parameter updated every 2.5 msec to realize a smooth output. An output of the LPC back-filtering circuit 111 is sent to an orthogonal conversion circuit 145, such as a discrete Fourier transform circuit, of the sinusoidal analysis encoding unit 114, specifically, a harmonic encoding circuit.

The α-parameter from the LPC analysis circuit 132 of the LPC analysis quantization unit 113 is sent to a psychoacoustic weighting filter calculating circuit 139 where data for psychoacoustic sensitivity is found. This weighted data is sent to the psychoacoustically weighted vector quantization unit 116, psychoacoustic weighting filter 125 of the second encoding unit 120 and to the psychoacoustically weighted synthesis filter 122.

In the sinusoidal analysis encoding unit 114, such as the harmonic encoding circuit, an output of the LPC back-filtering circuit 111 is analyzed by a harmonic encoding method. That is, the sinusoidal analysis encoding unit 114 detects the pitch, calculates the amplitude Am of each harmonics and performs V/UV discrimination. The sinusoidal analysis encoding unit 114 also dimensionally converts the number of the amplitudes Am or the envelope of harmonics, which is changed with the pitch, into a constant number.

In a specified example of the sinusoidal analysis encoding unit 114, shown in FIG. 3, routine harmonic encoding is presupposed. In particular, in multi-band excitation (MBE) encoding, modelling is preformed on the assumption that a voiced portion and an unvoiced portion are present in each frequency range or band at a concurrent time, that is in the same block or frame. In other forms of harmonic coding, an alternative decision is made as to whether the speech in a block or frame is voiced or unvoiced. In the following explanation, V/UV on the frame basis means the V/UV of a given frame when the entire band is UV in case the MBE coding is applied. Meanwhile, the Japanese Laying-Open Patent H-5-265487, proposed by the present Assignee, discloses a specified example for the synthesis by analysis method of MBE.

An open-loop pitch search unit 141 of the sinusoidal analysis encoding unit 114 of FIG. 3 is fed with an input speech signal from the input terminal 101, while a zero-crossing counter 142 is fed with a signal from a high-pass filter (HPF) 109. The orthogonal conversion circuit 145 of the sinusoidal analysis encoding unit 114 is fed with LPC residuals or linear prediction residuals from the LPC back-filtering circuit 111. The open-loop pitch search unit 141 takes the LPC residuals of the input signal to perform relatively rough pitch search by taking LPC residuals of the input signal. The extracted rough pitch data is sent to a high-precision pitch search unit 146 where high-precision pitch search by the closed loop as later explained (fine pitch search) is performed. From the open-loop pitch search unit 141, the maximum normalized autocorrelation value r(p), obtained on normalizing the maximum value of the autocorrelation of the LPC residuals, are taken out along with the rough pitch data, and sent to the V/UV decision unit 115.

The orthogonal conversion circuit 145 performs orthogonal transform processing, such as discrete cosine transform (DFT), to transform LPC residuals on the time axis into spectral amplitude data. An output of the orthogonal conversion circuit 145 is sent to the high-precision pitch search unit 146 and to a spectrum evaluation unit 148.

The high-precision (fine) pitch search unit 146 is fed with a rough pitch data of a relatively rough pitch extracted by the open-loop pitch search unit 141 and with data on the frequency domain extracted by the open-loop pitch search unit 141. In this high-precision pitch search unit 146, pitch data are swung by ±several samples, with the rough pitch data value as center, to approach to values of fine pitch data having an optimum decimal point (floating). As the fine search technique, the so-called analysis by synthesis method is used and the pitch is selected so that the synthesized power spectrum will be closest to the power spectrum of the original speech. The pitch data from the high-precision pitch search unit 146 by the closed loop is sent through switch 118 to the output terminal 104.

In the spectrum evaluation unit 148, the magnitude of each harmonics and a spectral envelope as its set are evaluated, based on the pitch and the spectral amplitude as an orthogonal transform output of the LPC residuals. The result of the evaluation is sent to the high-precision pitch search unit 146, V/UV decision unit 115 and to the psychoacoustically weighted vector quantization unit 116.

In the V/UV decision unit 115, V/UV decision of a frame in question is given based on an output of the orthogonal conversion circuit 145, an optimum pitch from the high-precision pitch search unit 146, amplitude data from the spectrum evaluation unit 148, a maximum normalized autocorrelation value r(p) from the open-loop pitch search unit 141 and the value of zero crossings from the zero-crossing counter 142. The boundary position of the result of the band-based V/UV decision in case of MBE coding may also be used as a condition of the V/UV decision of the frame in question. A decision output of the V/UV decision unit 115 is taken out via output terminal 105.

An output of the spectrum evaluation unit 148 or an input of the vector quantization unit 116 is provided with a number of data conversion unit 119, which is a sort of a sampling rate conversion unit. This number of data conversion unit operates for setting the amplitude data $|A_m|$ of the envelope to a constant number in consideration that the number of bands split on the frequency domain is varied with the pitch and hence the number of data is varied. That is, if the effective band is up to 3400 kHz, this effective band is split into 8 to 63 bands, depending on the pitch, such that the number $m_{MX}+1$ of the amplitude data $|A_m|$ obtained from band to band also is varied in a range from 8 to 63. So, the number of data conversion unit 119 converts this variable number $m_{MX}+1$ amplitude data into a constant number M, for example, 44.

The above-mentioned constant number M, such as 44, amplitude data or envelope data from the number of data conversion unit provided at an output of the spectrum evaluation unit 148 or at an input of the vector quantization unit 116 are taken together in terms of a pre-set number of data, such as 44 data, as vectors, which are subjected to weighted vector quantization. This weighting is imparted by an output of the psychoacoustic weighting filter calculating circuit 139. An index idS of the above-mentioned envelope from the vector quantization unit 116 is outputted at the output terminal 103 through switch 117. Meanwhile, an inter-frame difference employing an appropriate leakage coefficient may be taken for a vector made up of a pre-set number of data prior to the weighted vector quantization.

The second encoding unit 120 is hereinafter explained. The second encoding unit 120 is of the so-called CELP (code excited linear prediction) and is especially used for encoding the unvoiced portion of the input speech signal. In this CELP encoding configuration for the unvoiced speech portion, a noise output corresponding to the LPC residuals of the unvoiced speech as a representative output of the noise codebook, or a so-called stochastic codebook 121, is sent through a gain circuit 126 to the psychoacoustically weighted synthesis filter 122. The weighted synthesis filter 122 LPC-synthesizes the input noise to send the resulting signal of the weighted unvoiced speech to a subtractor 123. The subtractor is fed with speech signals, supplied from the input terminal 101 via a high-pass filter (HPF) 109 and which has been psychoacoustically weighted by a psychoacoustically weighting filter 125, to take out a difference or error from a signal from the synthesis filter 122. It is noted that a zero input response of the psychoacoustically weighting synthesis filter is to be subtracted at the outset from an output of the psychoacoustically weighting filter 125. This error is sent to a distance calculating circuit 124 to make distance calculations to search a representative value vector which minimizes the error by the noise codebook 121. It is the time domain waveform, which employs the closed loop search employing in turn the analysis by synthesis method, that is vector quantized.

As data for UV (unvoiced) portion from the second encoding unit 120 employing the CELP encoding configuration, the shape index idSI of the codebook from the noise codebook 121 and the gain index idGI of the codebook from a gain circuit 126 are taken out. The shape index idSI, which is the UV data from the noise codebook 121, is sent through a switch 127s to an output terminal 107s, whilst the gain index idGI, which is the UV data of the gain circuit 126, is sent via switch 127g to an output terminal 107g.

These switches 127s, 127g and the above-mentioned switches 117, 118 are on/off controlled based on the results of V/UV discrimination from the V/UV decision unit 115. The switches 117, 118 are turned on when the results of V/UV decision of the speech signals of the frame now about to be transmitted indicate voiced sound (V), whilst the switches 127s, 127g are turned on when the speech signals of the frame now about to be transmitted are unvoiced sound (UV).

The parameters outputted by the above-described speech encoder 3, that is LSP parameters LSP, voiced/unvoiced discriminating parameters VUV, pitch parameters PCH, codebook parameter idS and the gain index idG of the spectral envelope, noise codebook parameter idSI and the gain index idGI are classed into 2 k/4 kbps coding and the numbers of allotted bits are also indicated, as shown in FIGS. 4 and 5. FIG. 4 shows parameters common to 2 kbps and 4 kbps, whilst FIG. 5 shows parameters proper only to 4 kbps. The parameters shown in FIGS. 4 and 5 are those per frame.

The LSP parameters are classed into LSP0, LSP2, LSP3, LSP4 and LSP5. The LSP0 is the codebook index of the order-ten LSP parameter, and is used as a basic parameter of the envelope. In a frame of 20 msec, 5 bits are allotted to the LSP0. The LSP2 is a codebook index of an LSP parameter for order-five low frequency range error correction and has 7 bits allotted thereto. The LSP3 is a codebook index of an LSP parameter for order-five high frequency range error correction and has 5 bits allotted thereto. The LSP5 is a codebook index of an LSP parameter for order-ten full frequency range error correction and has 8 bits allotted thereto. Of these, LSP2, LSP3 and LSP5 are indices used for compensating the error of the previous stage and are used supplementarily when the LSP0 has not been able to represent the envelope sufficiently. The LSP4 is a 1-bit selection flag for selecting whether the encoding mode at the time of encoding is the straight mode or the differential mode. Specifically, it indicates the selection of a mode with a smaller LSP difference between the LSP of the straight mode as found by quantization and the LSP as found by the quantized difference. If the LSP4 is 0 or 1, the mode is the straight mode or the differential mode, respectively.

The VUV parameter is a flag indicating whether the encoded speech data in a pre-set frame is voiced or unvoiced (voiced/unvoiced), and has two bits allotted thereto.

The PCH parameter is a pitch parameter, and is pitch data from the high-precision pitch search unit 146 by the closed loop as discussed above. To this pitch parameter are allotted 7 bits.

If the codebook parameter idS of the spectral envelope is 2 kbps, the codebook parameter is divided into zeroth LPC residual spectral codebook index represented as idS0 and the first LPC residual codebook index represented by idSI. The zeroth and first LPC residual spectral codebook indices are indices associated with the respective codebooks. The LPC residual spectrum is formed by addition of the two codebooks selected therefrom. The idG is the LPC residual spectral gain codebook index and has five bits allotted thereto. If the codebook parameter idS of the spectral envelope is 4 kbps, it is divided into the zeroth extension LPC residual spectral codebook index, represented by idS0_4 k, first extension LPC residual spectral codebook index, represented by idS1_4 k, second extension LPC residual spectral codebook index, represented by idS2_4 k and third extension LPC residual spectral codebook index, represented by idS3_4 k. To the idS0_4 k, idS1_4 k, idS2_4 k and to the idS3_4 k, 7, 10, 9 and 6 bits are allotted, respectively.

It is noted that idS0_4 k and so on correct error components between the quantized LPC residual spectrum obtained with idS0, idS1 and idG, and the correction range is allocated from the low frequency range to the high frequency range towards idS3_4 k.

The remaining parameters are used for unvoiced sound. Specifically, the parameters with SL, such as idSL00 or idSL11, denote the noise codebook indices, whereas those with GL, such as idGL00 or idGL11, indicate the noise codebook gain codebook indices. To the idSL00, idSL01, idGL00 and to the idGL01, 6, 6, 4 and 4 bits are allocated, respectively. 5 bits are allocated to the idSL10, idSL11, idSL12 and to the idSL13, whilst 3 bits are allocated to idGL10, idGL11, idGL12 and to the idGL13.

The parameters shown in FIGS. 4 and 5 are divided by the class division and inputting sequence decision unit 23 into plural classes, depending on the psychoacoustic sensitivity of the bits to the transmission path errors.

If the bit rate is 2 kbps, with the transmission rate of 3.5 kbps, with the transmission rate being 3.5 kbps, the class division and inputting sequence decision unit 23 divides the voiced sound and the unvoiced sound into e.g., six classes, as shown in FIGS. 6 and 7, in which the suffices "p" and "c" denote the previous and current frames, respectively. That is, two frames, that is the previous frame p and the current frame c, are considered here. The smaller the class number, the more crucial is the bit.

Referring to FIG. 6, the case of the voiced speech is explained. With the order-ten codebook index LSP0 of the LSP parameters, the entire five bits of both the previous frame p and the current frame c are of the class I. In both the previous frame p and the current frame c of of the codebook index LSP2 of the order-five low frequency range error correction of the LSP parameter, two bits are of the class I, with the remaining five bits being of the class VI. With the codebook index LSP3 of the order-five high frequency range error correction of the LSP parameters, one of the feve bits of both the previous frame p and the current frame c are of the class I, with the remaining four bits being of the class VI. With the straight mode/difference mode selection flag LSP4 of the LSP parameter, both the previous frame p and the current frame c are protected by the class I.

The two bits of the voiced/unvoiced flag are protected by the class I in both the previous frame p and the current frame c. As for the pitch parameter, 6 of seven bits are of the class I for both the previous frame p and the current frame c, with the remaining one bit being of the class VI.

The 5 bits of the LPC residual spectral gain codebook index idG are protected as being of the class I for both the previous frame p and the current frame c. The zeroth LPC residual spectral codebook index idS0 of the previous frame p and the current frame c are all of the class II, however, the zeroth LPC residual spectral codebook index idS0 of the current frame c are all of the class IV. On the other hand, the four bits of the first LPC residual spectral codebook index idSI of the previous frame p are all of the class III, however, four bits of the first LPC residual spectral codebook index idSI of the current frame c are all of the class V.

Referring to FIG. 7, the case of the bit rate of 2 kbps, with the transmission rate being 3.5 kbps, with the sound being unvoiced, is hereinafter explained.

In the codebook index LSP2 for correcting the order-five low frequency range error of the LSP parameter, 4 of seven bits of both of the previous frame p and the current frame c are of class I, with the remaining three bits being of the class VI. In the codebook index LSP3 for correcting the order-five high frequency range error of the LSP parameter, two of five bits of both of the previous frame p and the current frame c are of class I, with the remaining three bits being of the class VI. The straight mode/differential mode selection flag is protected with the class I for both of the previous frame p and the current frame c.

The two bits of the voiced/unvoiced sound flag VUV are protected with the class I for both of the previous frame p and the current frame c.

The four bits of the noise codebook gain codebook index idG00 are protected with the class I for both of the previous frame p and the current frame c. The four bits of the noise codebook gain codebook index idG01 are protected with the class I for both of the previous frame p and the current frame c. The six bits of the noise codebook gain codebook index idG00 are set to the class VI for both of the previous frame p and the current frame c. The six bits of the noise codebook gain codebook index idG01 are set the class I for both of the previous frame p and the current frame c.

In this unvoiced speech, part of bits of the class VI are protected as bits of the classes from II to V. However, if an error is detected, no measures are taken, as in the case of the bits of the other class VI.

If the bitrate is 4 kbps (transmission rate, 6.2 kbps), the class division and inputting sequence decision unit 23 divides the voiced sound and the unvoiced sound into e.g., seven classes, as shown in FIGS. 8 and 9. In these figures, suffices "p" and "c" again denote the previous and current frames, respectively. That is, two frames, that is the previous frame p and the current frame c, are considered here. Here again, the smaller the class number, the more crucial is the bit.

The case in which the sound is voiced is explained with reference to FIG. 8. In the order-ten codebook index LSP0 of the LSP parameter, five bits of both previous frame p and the current frame c are of the class I. In the codebook index LSP2 for correcting the order-five low frequency range error of the LSP parameter, four of seven bits of the previous frame p and the current frame c are of the class I, with the remaining three bits being of the class VII. In the codebook index LSP3 for correcting the order-five high frequency range error of the LSP parameter, each one of five bits of the previous frame p and the current frame c is of the class I, with the remaining four bits being of the class VII. The straight mode/differential mode selection flag LSP4 of the LSP parameter is protected with the class I for both of the previous frame p and the current frame c.

The two bits of the voiced/unvoiced sound fang VUV are protected with the class I for both of the previous frame p and the current frame c. On the other hand, six of seven bits of the pitch parameter PCH for both the previous frame p and the current frame c are set to the class I, with the remaining 1 bit being of the class VII.

In addition, five bits of the LPC residual spectral gain codebook index idG are set to the class I and protected. On the other hand, all of the four bits of the zeroth LPC residual spectral codebook index idS0 of the previous frame p are set to the class 111, whilst all of the four bits of the zeroth LPC residual spectral codebook index idS0 of the current frame c are set to the class V. The four bits of the first LPC residual spectral codebook index idSI of the previous frame p are all set to the class IV, however, the four bits of the first LPC residual spectral gain codebook index idS1 of the current frame c are all set to class VI.

On the other hand, five of seven bits of the zeroth extended LPC residual spectral codebook index idS0_4 k for both the current frame c and the current frame c are set to the class I, however, the remaining two bits are set to the class VII. Each one often bits of the first extended LPC residual spectral codebook index idS1_4 k for both the previous frame p and the current frame c is set to the class II, however, the remaining nine bits are set to the class II. One of nine bits of the first extended LPC residual spectral codebook index idS2_4 k for both the previous frame p and the current frame c are set to the class I, whilst the remaining nine bits are set to the class II. One of six bits of the third extended LPC residual spectral codebook index idS3_4 k for both the previous frame p and the current frame c are set to the class I, whilst the remaining eight bits are set to the class II. Moreover, each one of six bits of the third extended LPC residual spectral codebook index idS3_4 k for both the previous frame p and the current frame c is set to the class I, whilst the remaining five bits are set to the class II.

Referring to FIG. 9, the case in which the sound is the unvoiced, with the bitrate being 4 kbps (transmission rate, 6.2 kbps). In the order ten codebook index LSP0 of the LSP parameters, all of five bits of the previous frame p and the current frame c are set to the class I.

In the codebook LSP2 for correcting the low frequency range error correction of the LSP parameters, four of seven bits of the for both the previous frame p and the current frame c are set to the class I, with the remaining three bits being of the class VII. In the codebook index LSP3 of the order-five high frequency range error correction of the LSP parameters, one of five bits of both the previous frame p and the current frame c are set to the class I, with the remaining four bits being of the class VII. In the straight mode/differential mode selection flag LSP4 of the LSP parameters, both the straight mode/differential mode selection flag LSP4 are protected with the class I. In the codebook index LSP 5 of the order-ten full range error correction, one of eight bits of both the previous frame p and the current frame c are set to the class I, with the remaining seven bits being of the class VII.

The respective two bits of the voiced/unvoiced sound fang VUV are protected for both the previous frame p and the current frame c with the class I.

The respective two bits of the voiced/unvoiced sound flag VUV are set for both the previous frame p and the current frame c to the class I and protected. The four bits of the noise codebook gain codebook index idGL01 are all set to the class I for both the previous frame p and the current frame c and protected.

On the other hand, six bits of the noise codebook index idSL00 are set for both the previous frame p and the current frame c to the class VII and protected, whilst six bits of the noise codebook gain codebook index idGL01 are set to class VII for both the previous frame p and the current frame c.

Three bits of the noise codebook gain codebook index idGL10 are set for both the previous frame p and the current frame c to lass II and protected. Also, three bits of the noise codebook index idGL11 are protected as class I for both the previous frame p and the current frame c. Three bits of the noise codebook gain codebook index idGL12 are set for both the previous frame p and the current frame c to class I. The two of three bits of the noise codebook index idGL13 are all set to the class I for both the previous frame p and the current frame c, however, the remaining one bit is set to the class VII.

All of five bits of the noise codebook index idSL10 are set to class VII for both the previous frame p and the current frame c. Five bits of the noise codebook index idSL11 are all set to the class VII for both the previous frame p and the current frame c, whilst five bits of the noise codebook index idGL13 are set to the class VII for both the previous frame p and the current frame c.

Here again, part of bits of the class VII are protected as bits of the class II to class VI. If the bits are in error, no measures are taken such that the bits in error are handled in the same way as bits of the other class VII.

The inputting sequence of respective parameters of the voiced and unvoiced sound of 2 kbps from the class I to the class VI to the transmission path encoder (channel coder) 4 is explained with reference to FIGS. 10 and 11. The inputting sequence is again determined by the class division and inputting sequence decision unit 23, as discussed above. The bit arraying sequence is responsive to the psychoacoustic sensitivity of the bits to the transmission path errors. In these figures, suffices "p" and "c" again denote the previous and current frames, respectively, whilst the bit 0 denotes the LSB.

In FIG. 10, the inputting sequence of the class I of the voiced sound is the first bit of the voiced/unvoiced sound flag VUV of the previous frame p, followed by the zeroth bit of the voiced/unvoiced sound flag VUV of the previous frame p, followed by the zeroth bit of the straight mode/differential mode selection flag LSP4 of the previous frame p, followed by the fourth, third, second, first and zeroth bits of the LPC residual spectral gain codebook index idG of the previous frame p, fourth, third, second, first and the zeroth bits of the order-ten codebook index LSP0 of the LSP parameter of the previous frame, followed by sixth, firth, fourth, third, second, first and the zeroth bits of the pitch parameter PCH of the previous frame p, in this order. The inputting sequence up to this point is from No.0 to No.18 to the transmission path encoder 4. From the No.19 on, the inputting sequence continues in the sequence of the sixth bit of the codebook index LSP2 of the correction of the order-five low frequency range error correction of the LSP parameter of the previous frame p, as No.19, fourth bit of the codebook index LSP3 of the correction of the order-five high frequency error of the LSP parameter of the previous frame, as No.20 and the fifth bit of the codebook index LSP2 of the LSP parameter of the previous frame p, as No.21. The inputting sequence is further continued by the parameters of the current frame c, in such a manner that the sequence of No.0 to No.21 is repeated as No.22 to No.43.

The inputting sequence of the class II bits of the voiced speech (Nos.44 to 47) of the class II bits of the voiced sound is four bits of from the third to zeroth bits of the zeroth LPC residual spectral codebook index idS0 of the previous frame p, determined as shown in FIG. 10.

The inputting sequence of the class III bits of the voiced speech (Nos.48 to 51) of the class III bits of the voiced sound is four bits of from the third to zeroth bits of the first LPC residual spectral codebook index idS1 of the previous frame p, determined as shown in FIG. 10.

The inputting sequence of the class IV bits of the voiced speech (Nos.52 to 55) of the class IV bits of the voiced sound is four bits of from the third to zeroth bits of the zeroth LPC residual spectral codebook index idS0 of the previous frame p, determined as shown in FIG. 10.

The inputting sequence of the class V bits of the voiced speech (Nos.56 to 59) of the class V bits of the voiced sound is four bits of from the third to zeroth bits of the first LPC residual spectral codebook index idS1 of the current frame c, determined as shown in FIG. 10.

The inputting sequence of the class VI bits of the voiced speech (from No.60 to No.79) is the fourth, third, second, first and the zeroth bits of the codebook index LSP2 of the order-five low frequency range error correction of the LSP parameter of the previous frame P in this order. The inputting sequence up to this point is that for No.60 to No.64 to the transmission path encoder 4. The inputting sequence is continued by the third, second, first and zeroth bits of the codebook index LSP3 of the order-five high frequency range error correction of the LSP parameter of the previous frame P, as No.60 to No.64, in this order. The inputting sequence is further continued by the third, second, first and zeroth bits of the codebook index LSP3 of the order-five high frequency range error correction of the LSP parameter of the previous frame P, as No.65 to No.68, in this order. The No.69 bit is the zeroth bit of the pitch parameter PCH of the previous frame p. The inputting sequence is further continued by the fourth, third, second, first and zeroth bits of the codebook index LSP2 of the order-five high frequency range error correction of the LSP parameter of the previous frame p, as No.70 to No.74, in this order. The inputting sequence is further continued by the fourth, third, second, first and zeroth bits of the codebook index LSP3 of the order-five high frequency range error correction of the LSP parameter of the current frame c, as No.5 to No.78, in this order. The last No.79 bit is the zeroth bit of the pitch parameter PCH of the current frame c.

Referring to FIG. 11, the inputting sequence of the unvoiced sound is the first bit and the zeroth bit of the voiced/unvoiced sound flag VUV of the previous frame p, followed by the zeroth bit of the straight mode/differential mode selection flag LSP4 of the previous frame p, the third, second, first and the zeroth bits of the noise codebook index gain codebook idGL00 of the previous frame p, the third, second, first and the zeroth bits of the noise codebook index gain codebook idGL01 of the previous frame p, and by the fourth, third, second, first and the zeroth bits of the order-ten codebook index LSP0 of the LSP parameter of the previous frame p, in this order. The inputting sequence up to this point is that from No.0 to No.15 to the transmission path encoder 4. The bits of No.16 to No.19 are the sixth, fifth, fourth and the third bits of the codebook index LSP2 of the order-five low frequency range error correction of the LSP parameters of the previous frame p. The bits of No.20 and No.21 are the third and fourth bits of the codebook index LSP3 of the order-five low frequency range error correction of the LSP parameters of the previous frame p. In No.22 to No.43, the parameters of the current frame are inputted as repeating the above-mentioned sequence from Nos.0 to 21.

The inputting sequence of the class II of the unvoiced sound is three bits from the second to the zeroth bits, totalling at three bits, of the codebook index LSP2 of the order-five low frequency range error correction of the LSP parameters of the previous frame p and the second bit of the codebook index LSP3 of the order-five low frequency range error correction of the LSP parameters of the previous frame p (from No.44 to No.47).

The inputting sequence of the class III of the unvoiced sound is the first (No.48) and zeroth bit (No.49) of the codebook index LSP3 of the order-five low frequency range error correction of the LSP parameters of the previous frame p, totalling at three bits, the fifth bit (No.50) and the fourth bit (No.51) of the noise codebook index idSL00 of the previous frame p.

The inputting sequence of the class IV of the unvoiced sound is the second to zeroth bits of the order-five low frequency range error correction of the LSP parameters of the current frame c, totalling at three bits, and the second bit of the codebook index LSP3 of the order-five low frequency range error correction (Nos.52 to 55).

The inputting sequence of the class V of the unvoiced sound is the first bit (No.56) and the zeroth bit (No.57) of the codebook index LSP3 of the order-five low frequency range error correction of the LSP parameters of the current frame c. The No.58 and No.59 are the fifth and fourth bits of the noise codebook idSL00 of the current frame c.

The inputting sequence of the class IV bits of the unvoiced sound (from No.60 to No.79) is the third, second, first and the zeroth bits of the noise codebook idSL00 of the previous frame p. The inputting sequence up to this point is that for the No.60 to No.63 to the transmission path encoder 4. In the inputting sequence, No.64 to No.69 are the fifth, fourth, third, second, first and the zeroth bits of the noise codebook idSL00 of the previous frame p. The inputting sequence is continued by the third, second, first and the zeroth bits of the noise codebook idSL00 of the current frame c, as No.70 to No73. The inputting sequence is further continued by the fifth, fourth, third, second, first and the zeroth bits of the current frame c, as No.74 to No.79.

The inputting sequence to the transmission path encoder 4 (channel encoder) of the respective parameters of the voiced and unvoiced sounds of from class I to class VII of 4 kbps is shown in FIGS. 12 to 14 and in FIGS. 15 to 17. The inputting sequence here is determined by the class division and inputting sequence decision unit 23, as described above. The bit arraying sequence is responsive to the psychoacoustic sensitivity of the bits to the transmission path errors. In these figures, suffices "p" and "c" again denote the previous and current frames, respectively, whilst the bit 0 denotes the LSB.

FIG. 12 shows the inputting sequence of the class I of the voiced sound. The inputting sequence of the sum total of 66 bits of from No.0 to No.65 is set. This inputting sequence is the first bit of the voiced/unvoiced sound flag VUV of the previous frame p, followed by the zeroth bit of the voiced/unvoiced sound flag VUV of the previous frame p, zeroth bit of the straight mode/differential mode selection flag LSP4 of the LSP parameter of the previous parameter p, and by the fourth, third, second, first and the zeroth bits of the LSP residual spectral gain codebook index idG0 of the previous frame p, in this order. The inputting sequence is continued by the fourth, third, second, first and the zeroth bits of the order-ten codebook index LSP0 of the LSP parameter of the previous frame. The inputting sequence is further continued by sixth, fifth, fourth, third, second and first bits of the pitch parameter PCH of the previous frame p. The inputting sequence up to this point is that from No.0 to No.18 to the transmission path encoder 4. From the No.19 on, the inputting sequence is continued by the sixth, fifth (No.20), fourth (No.21) and third bit (No.22) of the codebook index LSP2 of correction of the low frequency range error of the LSP parameter of the previous frame. The inputting sequence further is continued by the sixth, fifth, fourth and the third bits of the zeroth extended LPC residual spectral codebook index idS3_4 k of the previous frame p as No.23 to No.27. For the No.28 and No.29, the fourth bit of the codebook index LSP3 of the correction of the order-five high frequency range error of the previous frame p and the seventh bit of the of the codebook index LSP5 of the LSP parameter of the correction of the order-ten full range error correction of the previous frame p are arrayed. For No.30 to No.32, the ninth bit of the first extended LPC residual spectral codebook index idS3_4 k, eighth bit of the second extended LPC residual spectral codebook index idS3_4 k and the fifth bit of the third extended LPC residual spectral codebook index idS3_4 k. For the No.33 to No.65, the parameters of the current frame c are inputted in a manner of repeating the sequence from No.0 to No.32.

The inputting sequence of from class II to class V of the voiced speech is shown in FIG. 13. A sum total of 44 bits of the class II are inputted in the sequence of from No.66 to No.109. For No.66 to No.74, the eighth, seventh, sixth, fifth, fourth, third, second, first and the zeroth bits of the first extended LPC residual spectral codebook index idS3_4 k of the previous frame are arrayed. For No.75 to No.82, the seventh, sixth, fifth, fourth, third, second, first and the zeroth bits of the second extended LPC residual spectral codebook index idS3_4 k of the previous frame are arrayed. For No.83 to No.87, the fourth, third, second, first and the zeroth bits of the third extended LPC residual spectral codebook index idS3_4 k of the previous frame are arrayed. For No.88 to No.109, bits relevant to the current frame c of a sum total of 22 bits from No.66 to No.87 are repeated.

For four bits of the class III, the third, second, first and the zeroth bits of the zeroth LPC residual spectral codebook index idS0 of the previous frame p are arrayed as No.110 to No.113.

For four bits of the class IV, the third, second, first and the zeroth bits of the zeroth LPC residual spectral codebook index idS1 of the previous frame p are arrayed as No.114 to No.117.

For four bits of the class V, the third, second, first and the zeroth bits of the zeroth LPC residual spectral codebook index idS0 of the current frame c are arrayed as No.118 to No.121.

The inputting sequence of the classes VI and VII of the voiced sound is shown in FIG. 14. A sum total of four bits of the class VI for No.122 to No.125 are arrayed in the sequence of the third, second, first and the zeroth bits of the first LPC residual spectral codebook index idS1 of the current frame c.

A sum total of 34 its of the class VII are allotted in No.126 to No.159 as follows: That is, for No.126 to No.128, the second, first and the zeroth bits of the codebook index LSP2 of the order-five low frequency range error correction of the previous frame p are arrayed. For No.129 to No.132, the third, second, first and the zeroth bits of the codebook index LSP3 of the order-five low frequency range error correction of the previous frame p are arrayed. For No.133 to No.139 are arrayed the sixth, fifth, fourth, third, second, first and the zeroth bits codebook index LSP5 of the LSP parameters of the order-ten full-band error correction. For No.140 is allotted the zeroth bit of the pitch parameter PCH of the previous frame. For No.141 and No.142, the first and zeroth bits of the zeroth extension LPC residual spectrum codebook index idS0_4 k are allotted. For No.143 to No.159 are repeated bits relevant to the current frame c of a sum total of 17 bits from No.126 to No.142.

The inputting sequence of the classes VI and VII of the voiced sound is shown in FIG. 15. The inputting sequence of a sum total of 66 bits from No.0 to No.65 are determined. The inputting sequence is the first and zeroth bits of the voiced/unvoiced sound flag VUV of the previous frame p, followed by the zeroth bit of the voiced/unvoiced sound flag VUV of the previous frame p, followed by the zeroth bit of the straight mode/differential mode selection flag LSP4 of the LSP parameter of the previous frame and the third, second, first and zeroth bits of the noise codebook index gain codebook idGL00 of the previous frame p, by the third, second, first and zeroth bits of the noise codebook index gain codebook idGL01 of the previous frame and by the fourth, third, second, first and the zeroth bits of the order ten codebook index LSP0 of the LSP parameter of the previous frame p. the inputting sequence up to this point is that from No.0 to No.15 to the transmission path encoder 4. The bits No.16 to No.19 are the sixth, fifth, fourth and third bits of the codebook index LSP2 of the correction of the low frequency range error of the LSP parameters of the previous frame p. For bits No.20 and No.21, the fourth bit of the order-five high frequency range error correction of the previous frame p and the seventh bit of the codebook index LSP5 of the LSP parameter of correction of the order ten full wave error of the previous frame p are arrayed. For the bits No.22 to No.24, the second, first and zeroth bits of the noise codebook index gain codebook idGL10 of the previous frame p are arrayed. For the bits No.22 to No.24, the second, first and zeroth bits of the noise codebook index gain codebook idGL10 of the previous frame p are arrayed. For the bits No.25 to No.27, the second, first and zeroth bits of the noise codebook index gain codebook idGL11 of the previous frame p are arrayed. For the bits No.28 to No.30, the second, first and zeroth bits of the noise codebook index gain codebook idGL12 of the previous frame p are arrayed.

For the bits Nos.31 and 32, the second and first bits of the noise codebook index gain codebook idGL13 of the previous frame p are arrayed. For the bits No.33 to 65, the parameters of the current frame c are inputted to repeat the sequence of the bits Nos.0 to 32.

The inputting sequence of the classes II and III of the voiced sound is shown in FIG. 16. Although not shown in FIG. 9, part of the class VII is protected with the CRC as bits of the classes II to VI, however, if error occurs, no measures are taken and the bits are handled similarly to the bits of the class VII. First, as the bit No.66, the zeroth bit of the noise codebook index gain codebook idGL13 of the previous frame p are entered. For the bits Nos.67 to 69, the second, first and the zeroth bits of the codebook index LSP2 of correction of the order-five low frequency range error of the previous frame p are arrayed. For the bits No.70 to No.73, the third, second, first and the zeroth bits of the codebook index LSP3 of correction of the order-five high frequency range error of the previous frame p are arrayed. For the bits No.74 to No.80, the sixth, fifth, fourth, third, second, first and the zeroth bits of the codebook index LSP3 of correction of the full frequency range error of the previous frame p are arrayed. For the bits No.81 to No.86, the sixth, fifth, fourth, third, second, first and the zeroth bits of the noise codebook index gain codebook idGL00 of the previous frame p are arrayed. For the bits No87, the fifth bit of the noise codebook index gain codebook idGL01 of the previous frame p are arrayed. For the bits No.88 to 109, the parameters of the current frame c are inputted to repeat the sequence of the bits Nos.66 to 87.

As the sum total of four bits of the class III of the unvoiced sound, the fourth, third, second and the first bits of the noise codebook index gain codebook idGL01 of the previous frame p are arrayed for the bits No.110 to No.113.

The inputting sequence of a sum total of 46 bits from class IV to class VII of the unvoiced sound is shown in FIG. 17. Although not shown in FIG. 9, part of the class VII is protected with the CRC as bits of the classes II to VI, however, if error occurs, no measures are taken and the bits are handled similarly to the bits of the class VII.

First, as bit No.114 of the class IV, the zeroth bit of the noise codebook index gain codebook idGL01 of the previous frame p is arrayed for the bit No.114 of the class IV. For the bits Nos.115 to 117, the fourth, third and the second bits of the noise codebook index gain codebook idGL01 of the previous frame p are arrayed.

For a sum total of four bits of the class V, the fourth, third, second and the first bits of the noise codebook index gain codebook idSL10 of the previous frame p are arrayed as the bits No.115 to No.117.

As the bit No.122 of the class VI, the zeroth bit of the noise codebook index gain codebook idSL10 of the current frame c are arrayed as No.122 of the class VI. For the bits No.123 to No.125, the fourth, third and second bits of the noise codebook index gain codebook idSL10 of the current frame are arrayed.

A sum total of 34 bits of the class VII is allotted as Nos.126 to 159 as follows: For the bits No.128 to No.132, the fourth, third, second, first and the zeroth bits of the noise codebook index gain codebook idSL10 of the previous frame p are arrayed. For the bits No.133 to No.137, the fourth, third, second, first and the zeroth bits of the noise codebook index gain codebook idSL12 of the previous frame p are arrayed. For the bits No.138 to No.142, the fourth, third, second, first and the zeroth bits of the noise codebook index gain codebook idSL13 of the previous frame p are arrayed. For the bits No.143 to 159, the bits relevant to the current frame c of 17 bits of from No.126 to No.142 are repeated.

The encoding parameters of the voiced and unvoiced sounds with the bitrate of 2 kbps are inputted at an inputting sequence shown in FIGS. 10 and 11 to the transmission path encoder 4 shown in FIG. 1. On the other hand, the encoding parameters of the voiced and unvoiced sounds with the bitrate of 4 kbps are inputted in the inputting sequence shown in FIGS. 12 to 17 to the transmission path encoder 4 of FIG. 1.

The CRC code calculating unit 5 of the transmission path encoder 4 then finds the CRC code CRC[i], if necessary, by a CRC polynominal shown in the following equation (1): 18

$$R(x) = \sum_{i=0}^{s} CRC[i] \cdot x^i$$

for class I, depending on the difference in the bitrate of 2 kbps/4 kbps and on the classification. In the class II and so on, CRC codes are similarly obtained using appropriate CRC polynominals.

In the above equation, $$x^6 \sum_{i=0}^{N} P[i] \cdot x^i = Q(x) \cdot G_{CRC}(x) + R(x) \qquad (2)$$

and $$G_{CRC}(x) = 1 + x^2 + x^3 + x^5 + x^6 \qquad (3)$$

The CRC code calculating unit 5 acquires the CRC code CRC[i], using the above equations (1) to (3), only for the classes I, II, IV and V for 2 kbps. Although both the voiced and unvoiced sounds may be processed, it is mainly contemplated in the present invention to adjust the output on the decoding device in keeping with an error detected depending on the CRC code applied to the relevant classes of the voiced sound excluding the class I.

The total number of bits from the class I to the class VI of the voiced speech of 2 kbps is shown in FIG. 18, in which the total number of bits from class I to class VII of the speech sound of 4 kbps is also shown.

With the class I of the voiced sound with 2 kbps, as an object, the CRC code calculating unit 5 calculates the audio frame 44 bits to 6 bits CRC code CRC[i] (CRC parity).

When the class II is an object, the CRC code calculating unit 5 calculates the 1-bit CRC parity from the audio frame 4 bits. If the class VI is an object, CRC parity is not calculated.

Using the CRC code CRC[i], obtained by the equations (1) to (3), and the inputting sequence P[i], shown in FIG. 10, the bit string CVin[i] is formed, as shown by the equation (4):

$$CV_{in}[i] = \begin{cases} P[i] & (0 \le i \le N) \\ CRC[i-N] & N+1 \le i < N+P. \end{cases} \quad (4)$$

With the class I of the voiced class of 4 kbps, as an object, the CRC code calculating unit 5 calculates 6-bit CRC parity from 66 bits of the audio frame. With the class II as an object, the CRC code calculating unit 5 calculates 6-bit CRC parity from 44 bits of the audio frame. With the classes III to VI as an object, the CRC code calculating unit 5 calculates 1-bit CRC parity from 4 bits of the audio frame. If the class VII is an object, the CRC parity is not calculated.

Using the CRC code CRC[i], as found by the equation (1) to (3), and the inputting sequence P[i], shown in FIGS. 12 to 14, the bit string CVin[i] is formed, as shown by the equation (4).

The convolution encoder 6 applies convolution coding to the bit set to which the CRC code sent from the CRC code calculating unit 5 is applied as necessary, that is the bit string CVin[i]. In this encoding device, convolution coding is applied only to the bit string CVin[i] consistent with the class I bit of the bitrates of 2 and 4 kbps for protection.

The convolution encoder 6 applies convolution coding not in need of tail bit, such as SRCPC (Systematic Rate Compatible Punctured Convolutional Code) used e.g., in H.223 Annex C, to the bit string CVIN[I] consistent with the class I bit of the bitrates of 2 and 4 kbps. The convolution coding in this convolution encoder 6 is performed at a double code rate, shown as 8/16 in FIG. 18. Thus, the total number of bits of 2 kbps class I is (audio frame 44 bits+CRC parity 6 bits)×2=100 bits, whilst the total number of bits of 4 kbps class I is (audio frame 66 bits+CRC parity 6 bits)×2=144 bits.

For class II to class V of 2 kbps, only the CRC code is applied, without performing the convolution coding. Therefore, the total number of bits is (audio frame 4 bits+CRC parity 1 bit)×1=5 bits. On the other hand, since no CRC code is generated in the class VI, only 20 bits of the audio frame is the total number of bits.

Since no convolution coding is used for class II to class VI of 4 kbps, the total number of bits of class II is (audio frame 44 bits+CRC parity 6 bits)×1=50 bits, as shown in FIG. 18, with the number of bits of class III to class VI being (audio frame 4 bits+CRC parity 1 bit)×1=5 bits. For class VII, in which no CRC code is generated, only 34 bits of the audio frame gives the total number of bits.

Therefore, with the 2 kbps source coder, in which the total of the entire classes is 140 bits, the bitrate is 3.5 kbps.

With the 4 kbps source coder, in which the total of the entire classes is 248 bits, the bitrate is 6.2 kbps.

The plural sorts of the encoding parameters, classed by the class division and inputting sequence decision unit 23 depending on the psychoacoustic sensitivity of the bits to transmission path errors and protected in the transmission path encoder 4 depending on the classes, are modulated by the modulator 7. Output bits of the modulator 7 are processed for transmission by the transmitter 8 and transmitted via antenna 10.

On the decoding device side, the bit string, as an encoded output demodulated by the antenna co-user 9, receiver 11 and the demodulator 13, is convolution decoded by the convolution decoder 16. The decoded bit string is sent to the CRC code comparator-frame masking unit 15 where the CRC code appended to the convolution decoding output of the convolution decoder 16 is compared to the CRC error correction code calculated from the bit group excluding the crucial bit group to adjust the convolution decoding output depending on the results of the comparison.

The CRC code comparator-frame masking unit 15 executes the error detection process for inspecting the transmission error using the error correction code appended to the convolution decoding output from the convolution decoding step executed by the convolution decoder 16 and an output adjustment step of adjusting the convolution decoding output depending on the result of error inspection at the error inspection step.

In particular, if the CRC code is not coincident, that is if the CRC error is detected, and the speech is decoded using data of the frame in question, the speech quality is deteriorated appreciably. So, error protection processing (frame masking) is executed depending on the degree of error concatenation.

Figure 19:
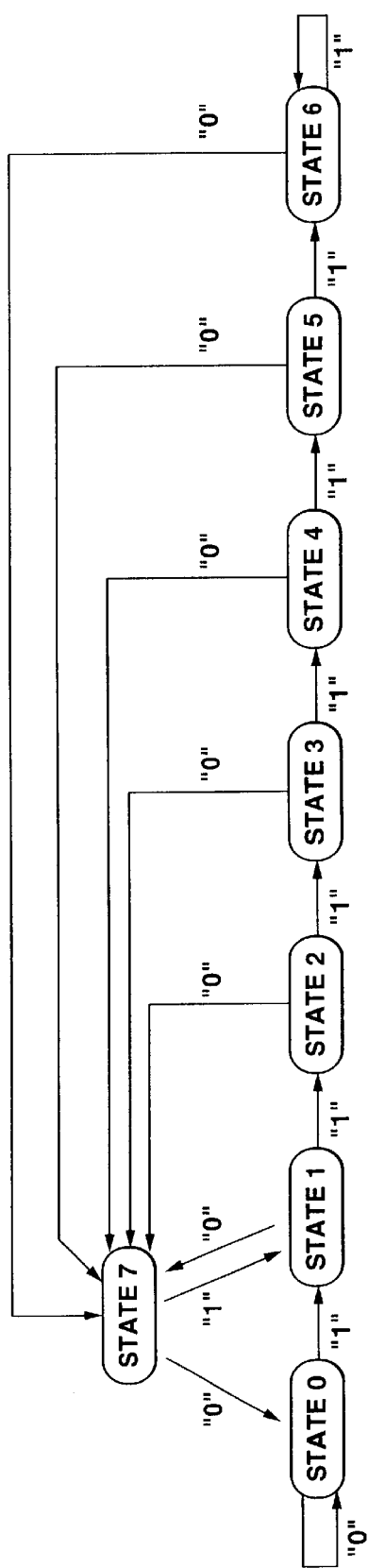
FIG. 19 shows state transition for illustrating the operation of a transmission path decoder constituting the portable telephone device.

The frame masking state of the current frame is updated depending on the CRC decoding results of class I. FIG. 19 shows the state transition by the frame masking processing. The respective states (state 0 to state 7) undergo transition in the direction indicated by arrow. The transition occurs from state 0. On a transition line, "1" and "0" indicate the direction of transition in case of an error-corrupted frame and the direction of transition in case of an error-free frame, respectively.

The following parameter substitution is executed depending on the state values. In an error-free state, the state value is 0 and the received speech frame bits are processed. The state 7 denotes the state of restoration.

If, in decoding the above LSP parameters, the state variable state is "state 1" to "state 6", the LSP parameters are replaced by those of the previous frame.

If, in the state 7 of restoration, LSP=0, indicating that the LSP mode is straight type, the LSP parameters are calculated from the entire LSP codes. If LSP=4 indicating that the LSP mode is of the differential type, the LSP parameters are calculated from the following equation (5):

$$LSP_{base}(n) = p \cdot LSP_{prev}(n) + (1-p)LSP_{U/V}(n) \text{ For } n=1 \ldots 10 \quad (5)$$

such that, in the differential mode, the LSP parameters from the LSP0 code is interpolated with those of the previous frame.

In the above equation (5), $LSP_{base}(n)$ is the LAP parameter of the basic layer, $LSP_{prev}(n)$ is the LSP parameter of the previous frame and $LSP_{0th}(n)$ is the parameter decoded from the LSP0 code. On the other hand, P is an interpolation coefficient and is changed in a range from 0.7 to 0.0 every 0.1 by the number (frame) of CRC error frames directly previous to the class I. For example, if the number of past error frames is 0, P=0.7 is used, with the $LSP_{base}(n)$ of the basic layer being $0.7 \cdot LSP_{prev}(n) + 0.3 \cdot LSP_{0th}(n)$. LSP2, LSP3 and LSP5 codes are overlooked and the $LSP_{base}(n)$ is used as the current LSP parameter.

A mute variable mute, controlling the sound volume of the output sound depending on the value of the state variable state, is set as shown in FIG. 21. For example, if the state variable state is 0, the mute variable mute is set to 1.000. If the state variable state is 6, the mute variable mute is set to 0.000. For the state variable state=7, the mute variable mute used is an average value of 1.0 and an average value of the previous frame. However, if the average value exceeds 0.8, 0.8 is used.

The substitution of the voiced sound parameter and the gain control are performed as follows:

If the voiced/unvoiced decision parameter VUV is V, and the state variable stale is 1 to 6, the codebook parameters idS0, IdS1, LPC residual spectral gain codebook index idG and spectral parameters idS0_4 k to idS3_4 k for 4 kbps are replaced by those of the previous frame. For controlling the sound volume of the output speech, the harmonic level parameters Am[00 . . . 127] of the LPC residual signals are gain-controlled as in the following equation (6):

$$Am[i] = mute * Am_{(org)}[i] \text{ for } i=0 \ldots 127 \quad (6)$$

where $AM_{(org)}[i]$ has been calculated from the spectral parameters.

If, in the state 7, the directly previous frame on restoration to the voiced speech is unvoiced, the following equation (7):

$$Am[i] = 0.6 * muteAm_{(org)}[i] \quad (7)$$

is used in place of the equation (6), in order to suppress the gain to maintain continuity, in other words, to suppress waveform from being disturbed by difference in forward and aft side spectral portions.

Meanwhile 4 bits each of the previous frame p and the current frame c of the zeroth LPC residual spectral codebook index idS0 and the first LPC residual spectral codebook index idS1 are of other classes than class I and class VI for 2 kbps, as shown in FIG. 6, so that, from FIG. 18, these bits are individually protected by the 1 CRC bit. If, in the state 0 or state 7, that is during normal state or on restoration, CRC errors of these classes for the same frame are detected simultaneously, the quantized harmonics level parameters Am[00 . . . 44] of the fixed dimension are converted from the original $Am_{qnt(org)}[1 \ldots 44]$ for suppressing the low frequency range level, as indicated by the following equation (8):

$$Am_{ant}[i] = s[i] * Am_{qnt(org)}[i] \quad 8).$$

In this equation (8), s[i] is a coefficient for suppressing $Am_{qnt(org)}$ and is set as shown in FIG. 22.

For 4 kbps, almost all bits of the first extension LPC residual spectral code index idS1_4 k, second extension LPC residual spectral code index idS2_4 k and the third extension LPC residual spectral code index idS3_4 k are protected as being class II bits by plural CRC bits. If an error is detected in the class II, a spectral envelope of the extension layer is disregarded.

For example, if the VUV decision parameter is UV, and the state variable state=1 to 6, the noise codebook gain parameters idGL00, idGL01 and the noise codebook gain parameters idGL10 to idGL13 or 4 kbps are replaced by those of the previous frame. In a similar case, the noise codebook gain parameters idGL00, idGL01 may be replaced by idGL01 of the previous frame, whilst the noise codebook gain parameters idGL10 to idGL13 for 4 kbps may be replaced by idGL13 of the previous frame. The noise codebook gain parameters idGL00, idGL01 and the noise codebook gain parameters idGL10 to idGL13 for 4 kbps used are those obtained on generating uniform random numbers within the range of respective numbers of bits.

For controlling the sound volume of the output sound, the LPC residual signal res [00 . . . 159] are gain-controlled as shown by the following equation (9):

$$res[i] = mute * res_{org}[i] (0 \leq i \leq 159) \quad (9)$$

where res[i] is found from the noise codebook parameter.

The convolution coding output, frame-masked by the CRC code comparator-frame masking unit 15, is routed to the speech decoder 17.

Figure 23:
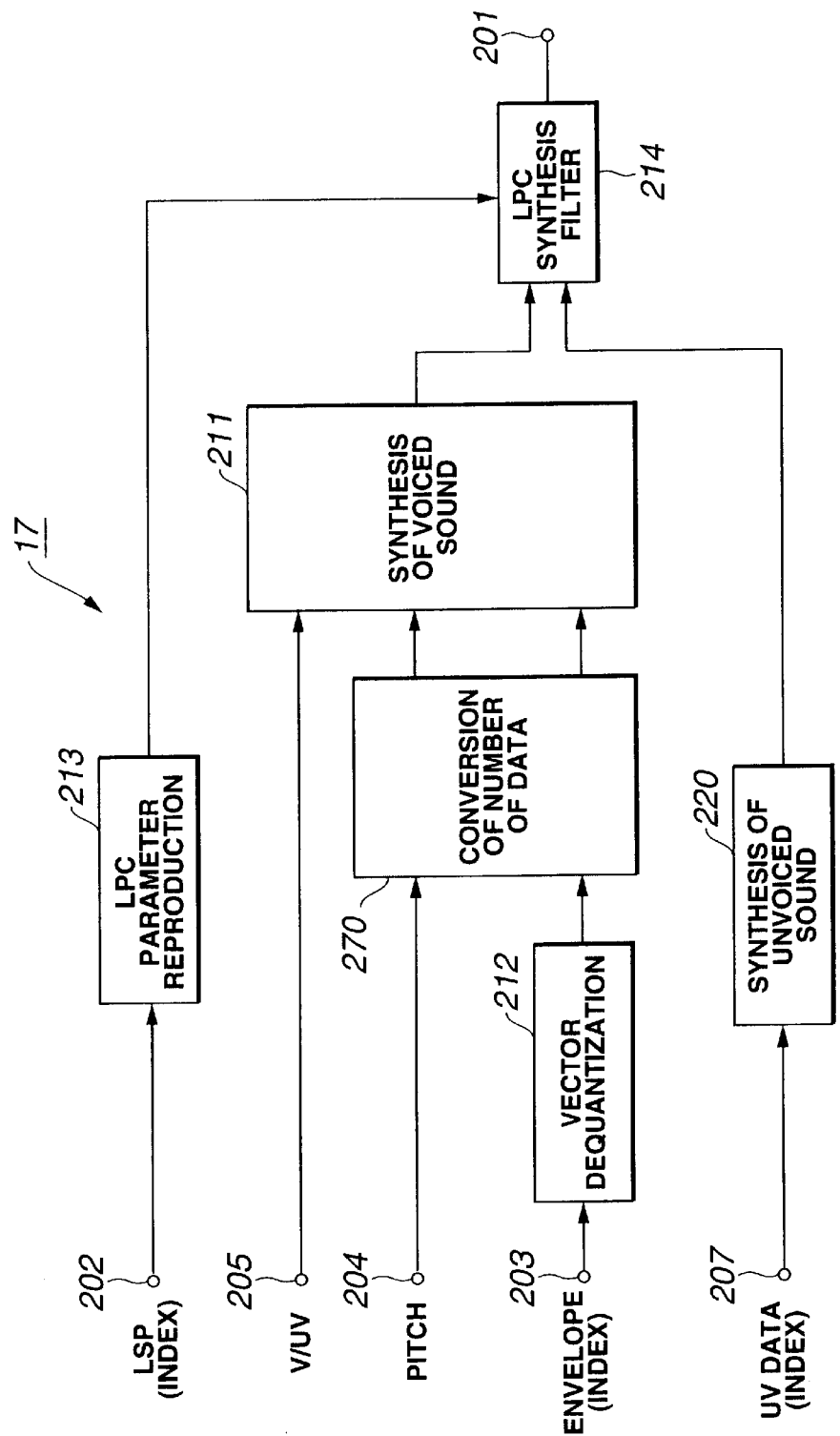
FIG. 23 is a block diagram showing a basic structure of the speech decoder.
Figure 24:
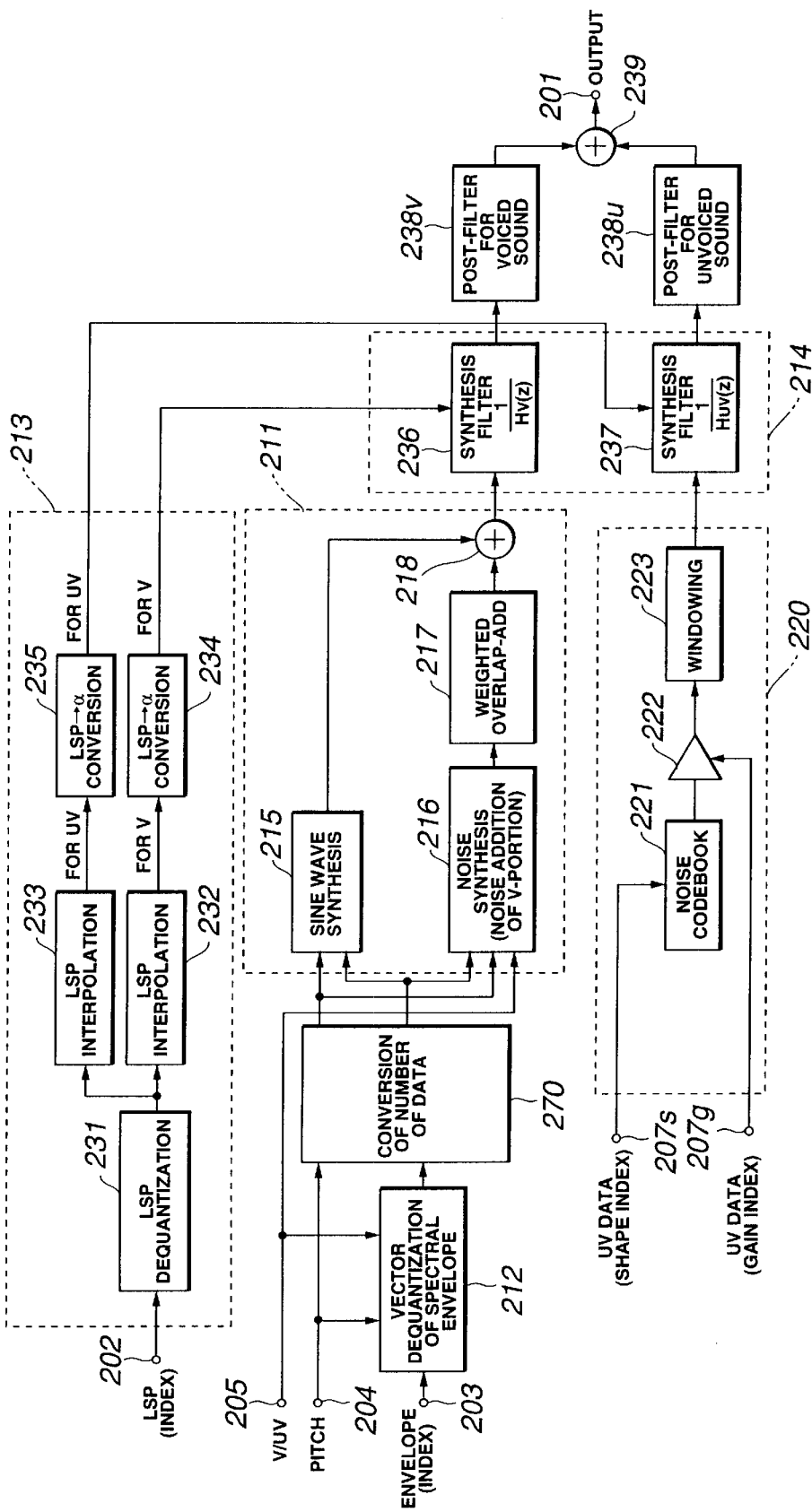
FIG. 24 is a block diagram showing a detailed structure of the speech decoder.

FIGS. 23, 24 show the configuration of the speech decoder 17. From the CRC code comparator-frame masking unit 15, the codebook indexes corresponding to the quantized output of the LSP (line spectrum pairs) are taken out via terminal 202, whilst the index, pitch and the VUV parameters as envelope quantization output are taken out via terminals 203 to 205 and the indexes the UV (unvoiced) data are taken out via terminal 207. The CRC error signals, obtained on CRC at the CRC code comparator-frame masking unit 15, are routed to an unvoiced sound synthesis unit 220.

The index as an envelope quantization output from the terminal 203 is sent to a vector dequantizer 212 for vector quantization to find a spectral envelope of the LPC residuals which are sent to a voiced sound synthesis unit 211. The voiced sound synthesis unit 211 synthesizes LPC residuals of the voiced sound portion by sinusoidal synthesis and is fed with the pitch and voiced/unvoiced decision output from terminals 204, 205. The LPC residuals of the voiced sound from the voiced sound synthesis unit 211 are sent to an LPC synthesis filter 214. The index of the UV data from the terminal 207 is sent to the unvoiced sound synthesis unit 220 where the noise codebook is referred to in order to take out the LPC residuals as the excitation vector of the unvoiced portion. These LPC residuals are also sent to the LPC synthesis filter 214 where the LPC residuals of the voiced portion and those of the unvoiced portion are independently processed with LPC synthesis. Alternatively, the LPC synthesis may be performed on the sum of the LPC residuals of the voiced portion and those of the unvoiced portion. The LSP index from the terminal 202 is sent to an LPC parameter reproducing unit 213 to take out α-parameters of the LPC which are sent to the LPC synthesis filter 214. The speech signals, obtained on LPC synthesis by the LPC synthesis filter 214, are taken out at an output terminal 201.

FIG. 24 shows a moire specified structure of the speech decoder 17 shown in FIG. 23. In FIG. 24, In the following description, parts or components which are the same as those shown in FIG. 23 are depicted by the same reference symbols.

To the input terminal 202 is sent the vector quantization output of LSP via the CRC code comparator-frame masking unit 15, that is the so-called codebook index.

The LSP index is sent to a vector dequantizer 231 of the LPC parameter reproducing unit 213 where the LSP data are processed with vector dequantization. The resulting data are sent to LSP interpolation circuits 232, 233 for LSP interpolation and thence sent to LSP→α converters 234, 235 for conversion to α-parameters of LPC (line prediction coding). This α-parameters are sent to the LPC synthesis filter 214. The LSP interpolation circuit 232 and the LSP→α converter 234 are for voiced sound (V), whilst the LSP interpolation circuit 233 and the LSP→α converter 235 are for unvoiced sound (UV). The LPC synthesis filter 214 separates an LPC synthesis filter for voiced sound 236 from an LPC synthesis filter for unvoiced sound 237. That is, the LPC coefficient interpolation is performed independently for the voiced and unvoiced portions to prevent adverse effects otherwise produced due to interpolation of LSPs of totally different properties at a transition point from voiced to unvoiced portions or from unvoiced to voiced portions.

The input terminal 203 is fed with weighting vector quantized code index data of the spectral envelope Am via thge CRC code comparator-frame masking unit 15. The input terminal 204 is fed with data of pitch parameter PCH via the CRC code comparator-frame masking unit 15, whilst the input terminal 205 is fed with voiced/unvoiced decision data via the CRC code comparator-frame masking unit 15.

The vector-quantized index data of the spectral envelope Am from the input terminal 203 is sent to the vector dequantizer 212 for vector dequantization which is the back-conversion corresponding to the data number cpnversion. The resulting data of the spectral envelope is sent to a sinusoidal synthesis circuit 215 of the voiced sound synthesis unit 211.

If frame-to-frame difference is taken prior to vector dequantization in encoding, the decoding of a frame-to-frame difference is performed after the vector dequantization, followed by data number conversion, to produce spectral envelope data.

The sinusoidal synthesis circuit 215 is fed with the pitch from the input terminal 204 and with the V/UV decision data from the input terminal 205. From the sinusoidal synthesis circuit 215, LPC residual data, corresponding to the output of the LPC back-filter 111 of FIGS. 2 and 3, are taken out and sent to an adder 218. The particular technique of this sinusoidal synthesis is disclosed in Japanese Laying-Open Patent H-5-265487 and in Japanese Laying-Open Patent H-8-063197 filed in the name of the present Assignee.

The envelope data from the vector dequantizer 212 and the pitch and V/UV decision data from the input terminals 204, 205 are routed to a noise synthesis circuit 216 for adding the noise of the voiced (V) portion. An output of the noise synthesis circuit 216 is sent to the adder 218 via a weighted weight addition circuit 217. The reason for doing this is that, since excitation which proves an input to the LPC filter of the voiced sound by sinusoidal synthesis gives a stuffed feeling in the low-pitch sound such as the male voice and the sound quality is suddenly changed between the voiced (V) and the unvoiced (UV) sound to give an unnatural feeling, the noise which takes into account the parameters derived from the encoded speech data, such as pitch, spectral envelope amplitude, maximum amplitude in a frame or the level of the residual signal is added to the voiced portion of the LPC residual signals of LPC synthesis filter input, that is the excitation, of the voiced portion.

The sum output of the adder 218 is sent to a synthesis filter 236 for voiced speech of the LPC synthesis filter 214 to undergo LPC synthesis processing to produce a time domain waveform signal, which then is filtered by a post filter for voiced speech 238v and thence is routed to an adder 239.

The shape index and the gain index, as UV data, are routed respectively to input terminals 207s and 207g, as shown in FIG. 24, and are thence supplied to the unvoiced sound synthesis unit 220. The shape index from the terminal 207s is sent to a noise codebook 221 of the unvoiced sound synthesis unit 220, whilst the gain index from the terminal 207g is sent to a gain circuit 222. A representative value output read out from the noise codebook 221 is the noise signal component corresponding to the LPC residuals of the unvoiced sound and is of a pre-set gain amplitude in the gain circuit 222. The noise signal component then is sent to a windowing circuit 223 where it is windowed to smooth out the junction to the voiced sound portion.

An output of the windowing circuit 223, as an output of the unvoiced sound synthesis unit 220, is routed to a synthesis filter for unvoiced (UV) sound 237 where it is processed with LPC synthesis to prove time waveform data for the unvoiced portion which is filtered by the post filter for unvoiced portion 238u and is thence supplied to the adder 239.

In the adder 239, the time waveform signal of the voiced portion from the post filter for voiced portion 238v is summed to the time waveform data of the unvoiced portion from the post filter for unvoiced portion 238u. The resulting data is taken out at an output terminal 201.

The decoded speech output, taken out at this output terminal 201, is converted by the D/A converter 18 into analog signals, which are issued as speech via speaker 19.

Figure 25:
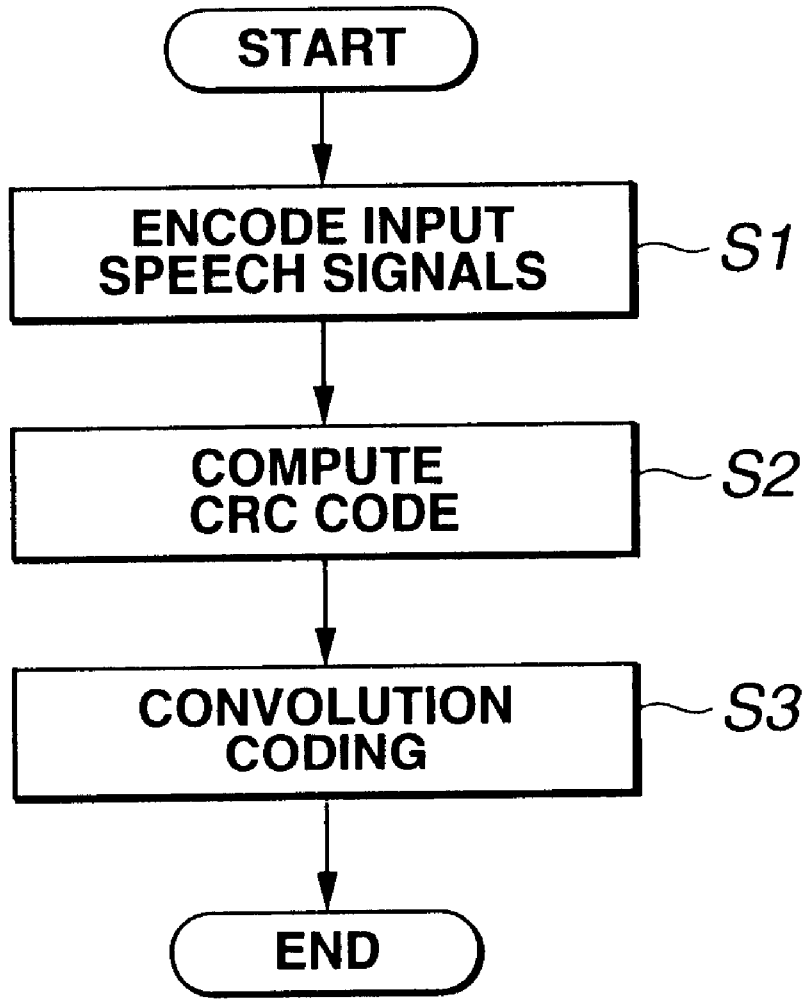
FIG. 25 is a flowchart for illustrating the encoding method executed by the portable telephone device.
Figure 26:
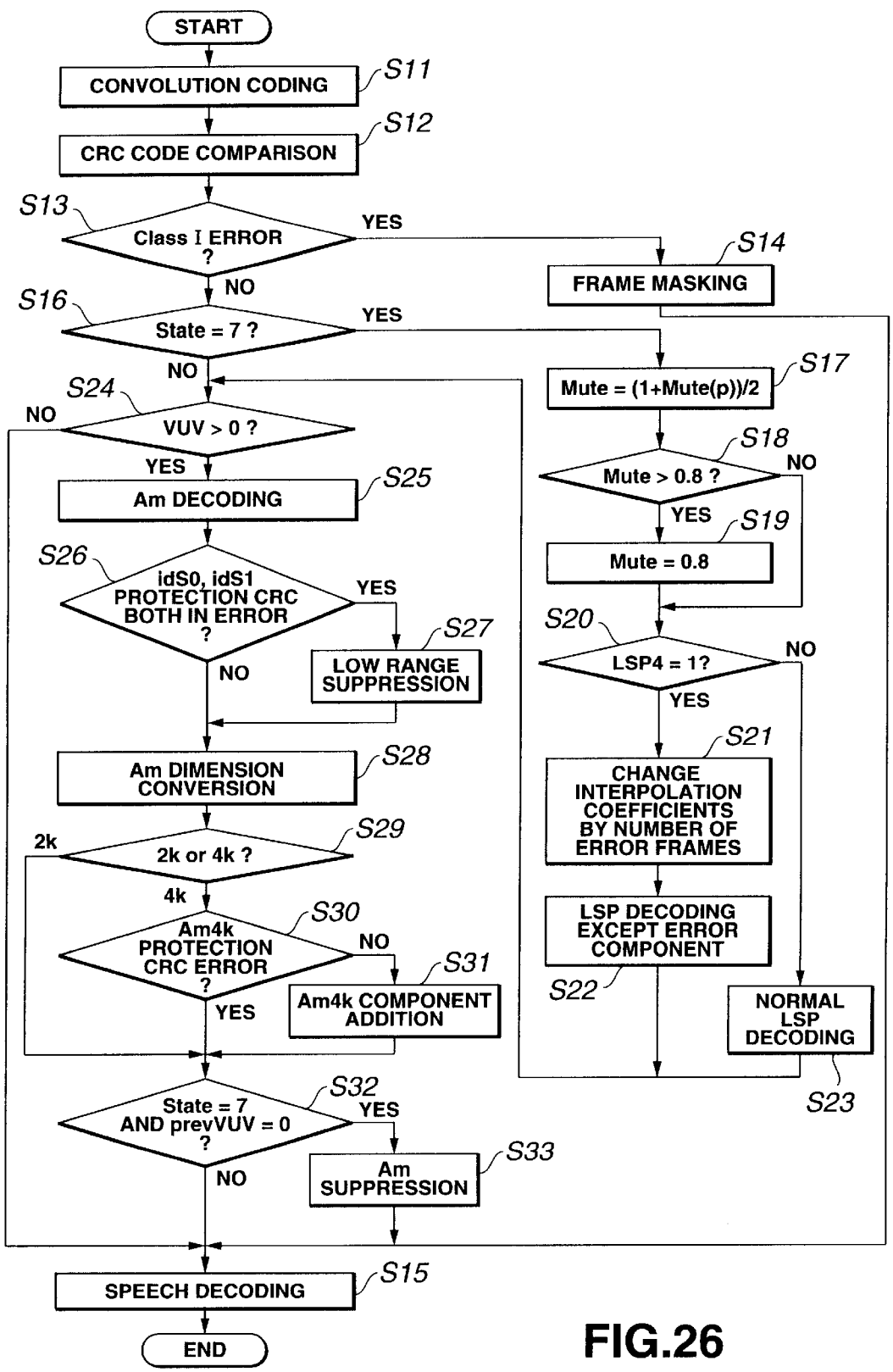
FIG. 26 is a flowchart for illustrating the decoding method executed by the portable telephone device.

FIGS. 25 and 26 show a flowchart for collectively showing the encoding method and the speech decoding method preformed by the portable telephone device.

Specifically, the speech encoding method performed by the encoding device of the portable telephone device is the processing of encoding an input speech signal by a speech encoding process of step S1, selecting a crucial bit set among the plural sorts of the speech encoding parameters from step S1 having high psychoacoustic sensitivity with respect to the transmission path error, calculating CRC code from the crucial bit set and convolution coding the CRC code calculated at step S2 to the crucial bit set at step Speech encoder 3.

The speech decoding processing executed by the decoding device of the portable telephone device is the processing of convolution decoding the convolution coding output from another portable telephone device at step S11 and detecting errors by CRC code comparison at step S12 for classes having CRC protective bits. At step S13, the frame masking state variable state is updated responsive to the CRC code comparison.

If no error has been detected at step S13, the program moves to step S16. If the variable is updated to state=7, the program moves to step S17 to verify at step S18 whether or not the variable mute has exceeded 0.8 as a result of averaging the variable mute (p) of the entire frames and 1. If the variable has not exceeded 0.8, the program moves to step S19 to set mute=0.8.

If it is verified at step S20 that LSP=1, with the mode being the differential mode, the program moves to step S21 to set an interpolation coefficient responsive to the number of errors of the directly previous class I. LSP decoding is done at step s22. The components LSP2, LSP3 and LSP5 corresponding to error components are not summed. If LSP is not 1 at step S20, the program moves to step S23 to perform routine LSP decoding.

If the state variable state is 0 or 7 and if the frame is the voiced frame (VUV>0) at step S24, the program moves to step S25 to decode the LPC residual spectrum Am by idS0, idS1 and idG. If errors are detected at step S26 simultaneously from the CRC bits individually added to idS0 and idS1, low range suppression is applied at step S27.

Meanwhile, since Am has been converted to the fixed dimension, dimension conversion is effected at step S28 for restoration to the pitch-based inherent dimension.

If the rate is 4 kbps at step S29, the program moves to step S30 where the CRC bits covering idS2_4 k, idS3_4 k and idS4_4 k as extension components of Am are checked. The extension components are summed at step S31 only when no error has been detected.

If state=7 at step S32, and prev VUV (VUV of the previous frame)=0, indicating unvoiced sound, the program moves to step S33 to suppress Am.

The portable telephone device having the transmission path encoder 4 and the encoder 3 as encoding device on the transmitting side is able to output encoding data strong against transmission path errors.

Also, the portable telephone device having the transmission path decoder and the speech decoder embodying the decoding method and apparatus of the present invention on the receiving side is able to suppress the lowering of the sound quality otherwise caused by the transmission path errors.

The portable telephone device having the decoding device and method embodying the present invention has been explained above. However, the present invention is not limited to a decoding device of the portable telephone device but is applicable to e.g., a transmission system.

Figure 27:
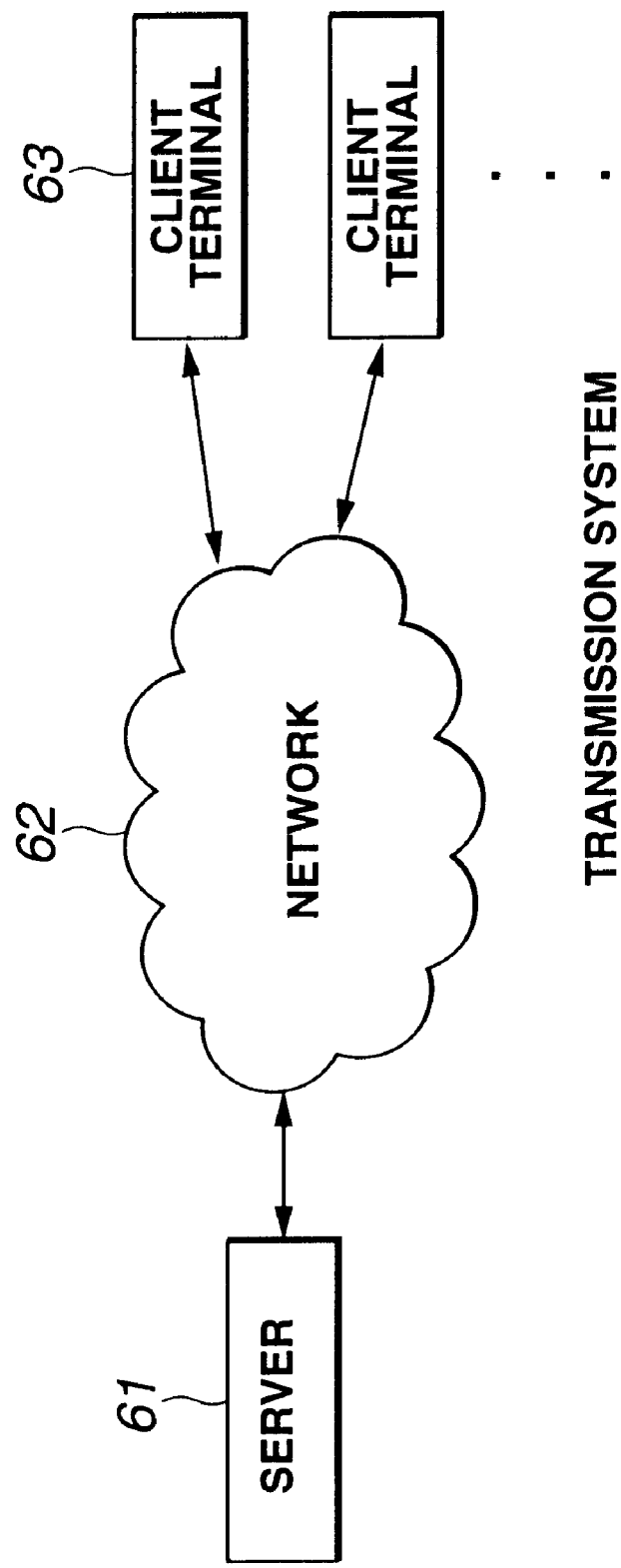
FIG. 27 is a block diagram of a transmission system to which the present invention can be applied.

FIG. 27 shows an illustrative structure of an embodiment of a transmission system embodying the present invention. Meanwhile, the system means a logical assembly of plural devices, without regard to whether or not the respective devices are in the same casing.

In this transmission system, the decoding device is owned by a client terminal 63, whilst the encoding device is owned by a server 61. The client terminal 63 and the server 61 are interconnected over a network 62, e.g., the Internet, ISDN (Integrated Service Digital Network), LAN (Local Area Network) or PSTN (Public Switched Telephone Network).

If a request for audio signals, such as musical numbers, is made from the client terminal 63 to the server 1 over the network 62, the encoding parameters of audio signals corresponding to requested musical numbers are protected responsive to psychoacoustic sensitivity of bits against transmission path errors on the network 62 and transmitted to the client terminal 63, which then decodes the encoding parameters protected against the transmission path errors from the server 61 responsive to the decoding method to output the decoded signal as speech from an output device, such as a speaker.

Figure 28:
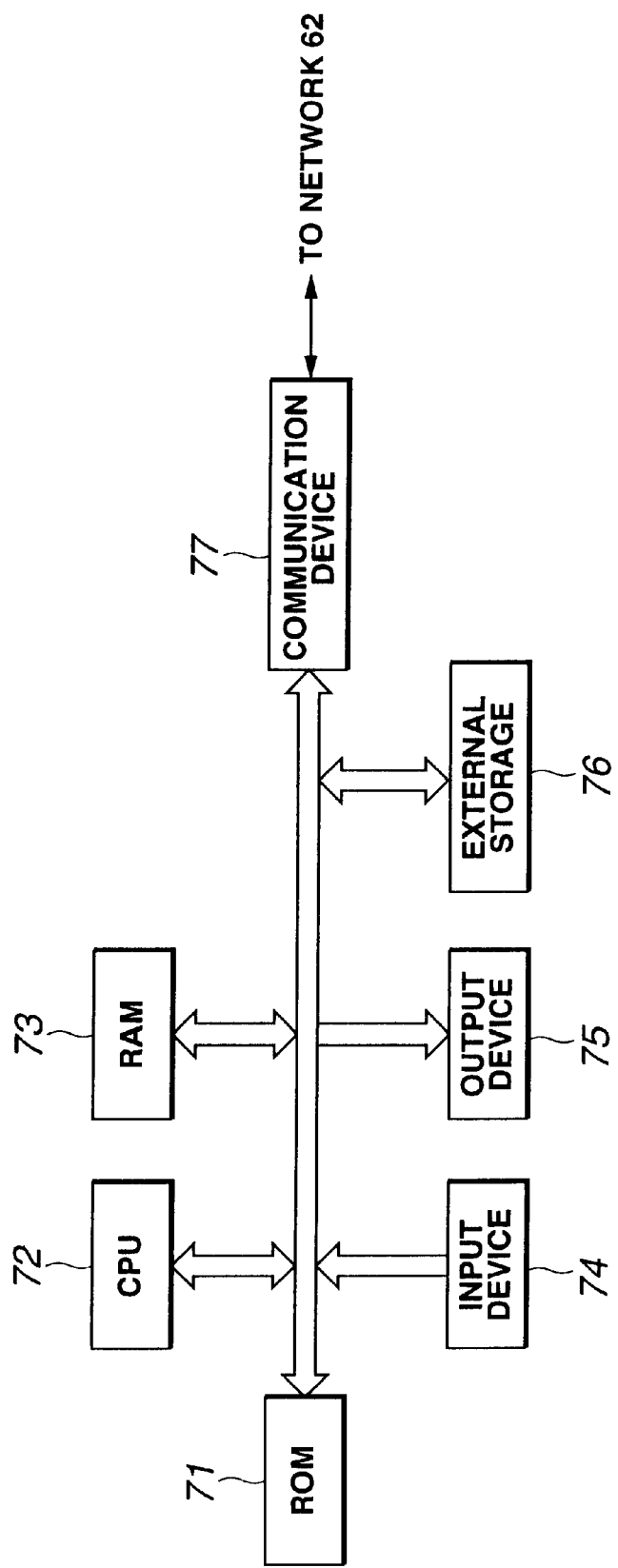
FIG. 28 is a block diagram of a server constituting the above transmission system.

FIG. 28 shows an illustrative hardware structure of a server 61 of FIG. 27.

A ROM (read-only memory) 71 has stored therein e.g., IPL (Initial Program Loading) program. The CPU (central processing unit) 72 executes an OS (operating system) program, in accordance with the IPL program stored in the ROM 71. Under the OS control, a pre-set application program stored in an external storage device 76 is executed to protect the encoding processing of audio signals and encoding obtained on encoding to perform transmission processing of the encoding data to the client terminal 63. A RAM (random access memory) 73 memorizes programs or data required for operation of the CPU 72. An input device 74 is made up e.g., of a keyboard, a mouse, a microphone or an external interface, and is acted upon when inputting necessary data or commands. The input device 74 is also adapted to operate as an interface for accepting inputs from outside of digital audio signals furnished to the client terminal 63. An output device 75 is constituted by e.g., a display, a speaker or a printer, and displays and outputs the necessary information. An external memory 76 comprises e.g., a hard disc having stored therein the above-mentioned OS or the pre-set application program. A communication device 77 performs control necessary for communication over the network 62.

The pre-set application program stored in the external memory 76 is a program for causing the functions of the speech encoder 3, transmission path encoder 4 or the modulator 7 to be executed by the CPU 72.

Figure 29:
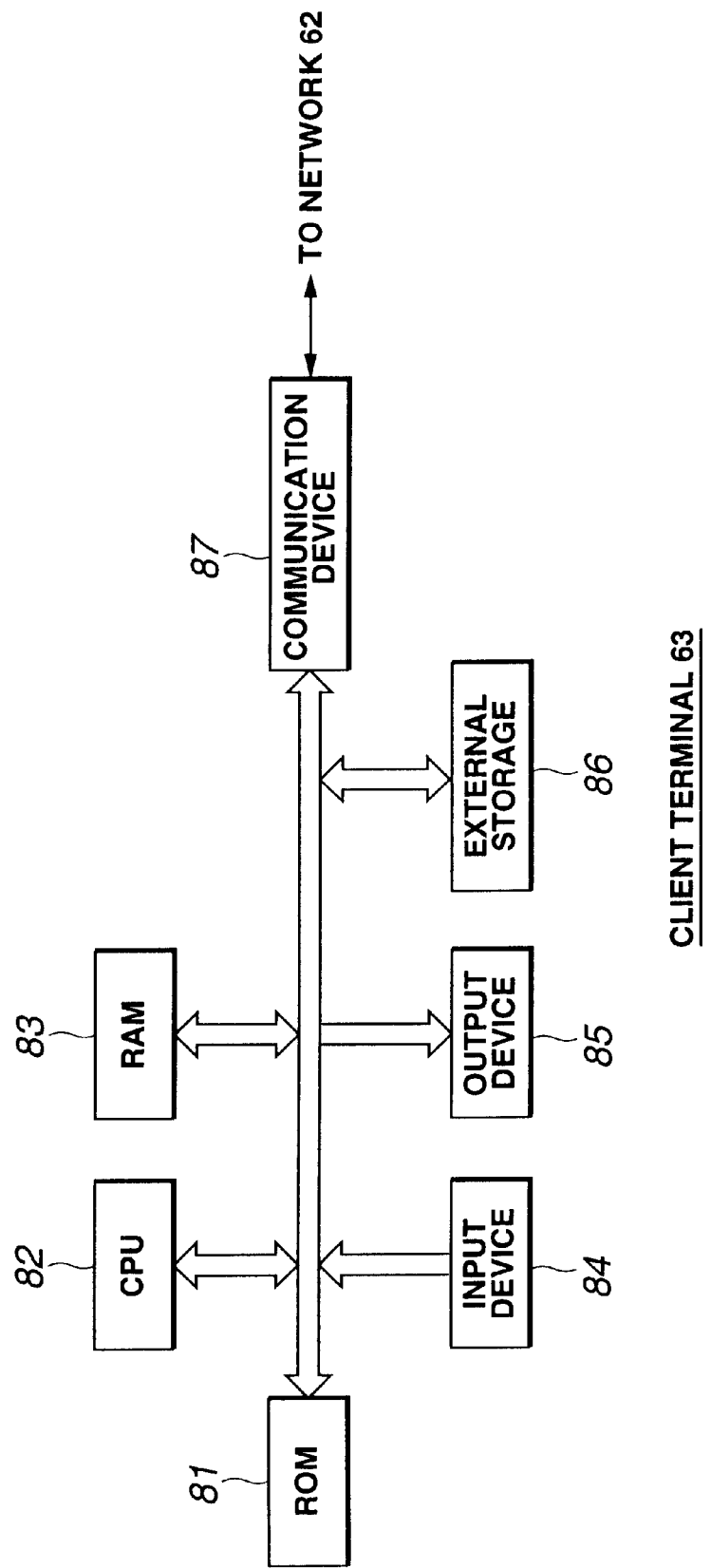
FIG. 29 is a block diagram showing a client terminal constituting the transmission system.

FIG. 29 shows an illustrative hardware structure of the client terminal 63 shown in FIG. 27.

The client terminal 63 is made up of a ROM 81 to a communication device 87 and is basically configured similarly to the server 61 constituted by the ROM 71 to the communication device 77.

It is noted that an external memory 86 has stored therein a program, as an application program, for executing the decoding method of the present invention for decoding the encoded data from the server 61 or a program for performing other processing as will now be explained. By execution of these application programs, the CPU 82 decodes or reproduces the encoded data protected against transmission path errors.

Specifically, the external memory 86 has stored therein an application program which causes the CPU 82 to execute the functions of the demodulator 13, transmission path decoder 14 and the speech decoder 17.

Thus, the client terminal 63 is able to realize the decoding method stored in the external memory 86 as software without requiring the hardware structure shown in FIG. 1.

It is also possible for the client terminal 63 to store the encoding data transmitted from the server 61 to the external storage 86 and to read out the encoded data at a desired time to execute the encoding method to output the speech at a desired time. The encoded data may also be stored in another external memory, such as a magneto-optical disc or other recording medium.

Moreover, as the external memory 76 of the server 61, recordable mediums, such as magneto-optical disc or magnetic recording medium may be used to record the encoded data on these recording mediums.

What is claimed is:

1. A decoding apparatus for decoding transmitted encoded parameters corresponding to input speech signals which have been encoded by an encoding device from one pre-set encoding unit on the time axis to another and which have been classified depending on the psychoacoustic sensitivity of bits to transmission path errors, the decoding apparatus comprising:

transmission path decoding means for detecting an error using an error check code appended to said encoding parameters of a pre-set class, wherein said encoding parameters are classified into a plurality of classes of voiced parameters and a plurality of classes of unvoiced parameters depending on the psychoacoustic sensitivity of bits to transmission path errors, and for providing for different frame masking processing depending on errors in the encoding parameters produced in said encoding unit.

2. The decoding apparatus according to claim 1 wherein the encoding processing in said encoding device is performed using a plurality of vector quantizers, an index representing each code vector is classified according to psychoacoustic sensitivity of bits against transmission path errors and is transmitted in this classified state, said transmission path decoding means detecting the error check codes appended to said index of a pre-set class to provide for different frame masking processing depending on an index error produced in said encoding unit.

3. The decoding apparatus according to claim 2 wherein the indexes transmitted from said encoding device is divided into a class which is convolution coded following appendage of an error check code responsive to psychoacoustic sensitivity of the bits against the transmission path error, a class in which simply an error check code is appended and a class in which no processing is made.

4. The decoding apparatus according to claim 2 wherein said transmission path decoding means performs frame masking processing if errors are found in more than a pre-set number of encoding units, and if otherwise, the indexes in error are straightly used.

5. The decoding apparatus according to claim 1 wherein the encoding processing in the encoding device is performed using a multi-stage vector quantizer prepared by alternate learning, and wherein an index representing each code vector is classified according to psychoacoustic sensitivity of bits against transmission path errors and is transmitted in this classified state, said transmission path decoding means detecting the error check codes appended to said index of a pre-set class to provide for different frame masking processing depending on whether or not an error has been detected in plural indexes.

6. The decoding apparatus according to claim 5 wherein the encoding processing in the encoding device is the encoding processing of quantizing and transmitting the spectral information of the speech by a two-stage vector quantizer by alternate learning, and wherein said transmission path decoding means performs frame masking processing for suppressing the low frequency range level when indexes representing code vectors outputted by two vector quantizers are in error simultaneously.

7. The decoding apparatus according to claim 1 wherein the transmission path decoding means performs frame masking processing of suppressing the signal level if, after errors are detected in one or more consecutive frames as pre-set encoding units on the time axis, a first regular frame is received, the first regular frame is voiced and the last regular frame after the error occurrence is unvoiced.

8. A decoding method for decoding transmitted encoded parameters corresponding to input speech signals which are previously encoded by an encoding device from one pre-set encoding unit on the time axis to another and which are previously classified depending on the psychoacoustic sensitivity of bits to transmission path errors, said decoding method comprising:

a transmission path decoding step of
detecting an error using an error check code appended to said encoding parameters of a pre-set class, wherein said encoding parameters are classified into a plurality of classes of voiced parameters and a plurality of classes of unvoiced parameters depending on the psychoacoustic sensitivity of bits to transmission path errors, and of
providing for different frame masking processing depending on errors in the encoding parameters produced in said encoding unit.

9. The decoding method according to claim 8 wherein the encoding processing in said encoding device is performed using a plurality of vector quantizers, an index representing each code vector is classified according to psychoacoustic sensitivity of bits against transmission path errors and is transmitted in this classified state, said transmission path decoding step detecting the error check codes appended to said index of a pre-set class to provide for different frame masking processing depending on an index error produced in said encoding unit.

10. The decoding method according to claim 8 wherein the encoding processing in the encoding device is performed using a multi-stage vector quantizer prepared by alternate learning, and wherein an index representing each code vector is classified according to psychoacoustic sensitivity of bits against transmission path errors and is transmitted in this classified state, said transmission path decoding means detecting the error check codes appended to said index of a pre-set class to provide for different frame masking processing depending on whether or not an error has been detected in plural indexes.

11. A medium for furnishing a program for decoding transmitted encoded parameters corresponding to input speech signals which have been encoded by an encoding device from one pre-set encoding unit on the time axis to another and which have been classified depending on the psychoacoustic sensitivity of bits to transmission path errors, said program comprising:

a transmission path decoding step of
detecting an error using an error check code appended to said extension of a pre-set class, wherein said encoding parameters are classified into a plurality of classes of voiced parameters and a plurality of classes of unvoiced parameters depending on the psychoacoustic sensitivity of bits to transmission path errors, and of
providing for different frame masking processing depending on errors in the extension produced in said encoding unit.

12. The program furnishing medium according to claim 11 wherein the encoding processing in said encoding device is performed using a plurality of vector quantizers, an index representing each code vector is classified according to psychoacoustic sensitivity of bits against transmission path errors and is transmitted in this classified state, said transmission path decoding step detecting the error check codes appended to said index of a pre-set class to provide for different frame masking processing depending on an index error produced in said encoding unit.

13. The medium according to claim 11 wherein the encoding processing in the encoding device is performed using a multi-stage vector quantizer prepared by alternate learning, and wherein an index representing each code vector is classified according to psychoacoustic sensitivity of bits against transmission path errors and is transmitted in this classified state, said transmission path decoding means detecting the error check codes appended to said index of a pre-set class to provide for different frame masking processing depending on whether or not an error has been detected in plural indexes.

* * * * *